(12) United States Patent
Cereo et al.

(10) Patent No.: US 6,320,693 B1
(45) Date of Patent: Nov. 20, 2001

(54) THERMAL TUNING OF OPTICAL AMPLIFIERS AND USE OF SAME IN WAVELENGTH DIVISION MULTIPLEXED SYSTEMS

(75) Inventors: Richard J. Cereo, Beaver Dams; David O. Culverhouse, Montour Falls; Thomas W. McNamara, Corning, all of NY (US); Shou-Jong Sheih, Red Bank, NJ (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/343,661

(22) Filed: Jun. 29, 1999

Related U.S. Application Data

(60) Provisional application No. 60/091,178, filed on Jun. 30, 1998.

(51) Int. Cl.[7] ............................. H04J 14/02; H01S 3/131
(52) U.S. Cl. ........................ 359/337; 359/132; 359/341; 372/6; 372/34
(58) Field of Search .................................. 359/124, 132, 359/161, 194, 337, 341; 372/6, 31, 32, 34

(56) References Cited

U.S. PATENT DOCUMENTS

| | | |
|---|---|---|
| 5,260,823 | 11/1993 | Payne et al. . |
| 5,287,216 | 2/1994 | Chirravuri et al. . |

(List continued on next page.)

FOREIGN PATENT DOCUMENTS

| | | |
|---|---|---|
| 0476830 A2 | 8/1991 | (EP) . |
| 2278230 | 11/1994 | (GB) . |
| 2293684 | 4/1996 | (GB) . |
| 63-318789 * | 12/1988 | (JP) . |
| 5048500 * | 2/1993 | (JP) . |
| 7-202299 | 8/1995 | (JP) . |

OTHER PUBLICATIONS

Kemtchou et al. "Gain Temperature Dependence of Erbium–Doped Silica and Fluoride Fiber Amplifiers in Multichannel Wavelength–Multiplexed Transmission Systems." *Journal of Lightwave Technology*, vol. 15, No. 11, Nov. 1997. pp. 2083–2090.

Kemtchou et al. "Temperature dependence of the gain in erbium–doped fiber amplifiers/Comparison between silica and fluoride fibers." Proc. Of the Opt. Amplif. and their Applications Meeting, Jul. 1997, Victoria, Canada, Paper MB5 (OSA).

Yamada et al. "Temperature Dependence of Signal Gain in $Er^{3+}$–Doped Optical Fiber Amplifiers." *IEEE Elec. Letters*, vol. 28, No. 3, Mar. 1992. pp. 640–649.

Lumholt et al. "Gain Variations for an Erbium Doped Fiber Amplifier in a Temperature–Range from 45 K to 320 K." *Journal of Optical Communications*, 13 (1992) 3, 114–116.

(List continued on next page.)

*Primary Examiner*—Nelson Moskowitz
(74) *Attorney, Agent, or Firm*—Svetlana Z. Short

(57) ABSTRACT

Techniques for controlling the shape of the gain spectrum of an optical amplifier (13) based on the temperature and level of inversion of the amplifier's amplifying medium (20) are provided. An increase in temperature for an amplifying medium having a high level of inversion results in an increase in gain for longer wavelengths relative to shorter wavelengths, i.e., a counterclockwise tilt of the gain spectrum, while an increase in temperature for an amplifying medium having a lower level of inversion results in the opposite effect, i.e., a clockwise tilt. These effects can be used to compensate for changes in the operating conditions of the amplifier, e.g., to compensate for changes in signal powers. The effects of thermal tuning are especially useful in WDM systems employing multi-stage amplifiers.

32 Claims, 25 Drawing Sheets

U.S. PATENT DOCUMENTS

| | | |
|---|---|---|
| 5,333,089 | 7/1994 | DiGiovanni et al. . |
| 5,363,385 | 11/1994 | Heidemann . |
| 5,506,724 | 4/1996 | Shimizu et al. . |
| 5,673,129 * | 9/1997 | Mizrahi ................................ 359/133 |
| 5,696,615 | 12/1997 | Alexander . |
| 5,745,283 | 4/1998 | Inagaki et al. . |

OTHER PUBLICATIONS

Georges and Delevaque. "Analytic modeling of high–gain erbium–doped fiber amplifiers." *Optics Letters*, vol. 17, No. 16, 1113–1115.

Kemtchou et al. "Comparison of Temperature Dependences of Absorption and Emission Cross–Sections in Different Glass Hosts of Erbium–Doped Fibers." *OSA TOPS on Optical Amplifiers and Their Applications*, 1996, vol. 5, 129–132.

Yamada et al. "Temperature Insensitive $Er^{3+}$–Doped Optical Fibre Amplifiers." *Electronics Letters*, Sep. 27, 1990, vol. 26 No. 20, 1649–1650.

Suyama et al. "Temperature Dependent Gain and Noise Characteristics of a 1480 nm–Pumped Erbium–Doped Fibre Amplifer." *Electronics Letters*, Oct. 11, 1990, vol. 26 No. 21, 1756–1757.

Kagi et al. "Temperature Dependence of the Gain in Erbium–Doped Fibers." *Journal of Lightwave Technology*, vol. 9, No. 2, Feb. 1991, 261–265.

Inoue et al, SEI Techn Rev., #46, pp. 56–62; Abst. Only Herewith, Jun. 1998.*

Lee et al, OFC '98, Tech. Digest, vol. 2, pp. 133–134; Abstract Herewith, Feb. 2, 1998.*

Suyama et al, Electronics Letters, vol. 26, #21, pp. 1756–1758; Abst. Herewith, Oct. 11, 1990.* da Silva et al, IEEE Photonics Tech. Lett., vol. 5, #4, pp. 412–414, Apr. 1993.*

Clesca, B., OSA Trends in Optics & Photonics, vol. 5, pp. 317–333, Jul. 13, 1996.*

Semulukoff et al, Jour. of Non–Abstr. Solids V184, pp. 240–243, 1995.*

Becker et al., "Erbium–doped fiber amplifier pumped in the 950–1000nm Region", IEEE Photonics Technology Letters, vol. , No. 1, Jan. 1990, pp. 35–37.

Giles et al., "Modeling Erbium–Doped Fiber Amplifiers", Journal of Lightwave Technology, vol. 9, No. 2, Feb. 1991, pp. 271–283.

Giles et al., "Optical Amplifiers Transform Long–Distance Lightwave Telecommunications", Proceedings of the IEEE, vol. 84, No. 6 June 1996, pp. 870–883.

Tachibana et al., "Gain cross saturation and Spectral hole burning in wideband erbium–doped fiber amplifiers", Optics Letters, vol. 16, No. 19, Oct. 1991, pp. 1499–1501.

Chou et al., "Inhomogeneous gain saturation of Erbium–doped Fiber amplifiers", Proceedings, Optical Amplifiers and their Application, Davos, Switzerland, 1995, pp. 92–95.

Srivastava et al., "Room temperature spectral hole–burning in erbium–doped fiber amplifiers ", Optical Fiber Communications Conference, San Jose, Ca., 1996 (TuG7), pp. 33–34.

Desurvive et al., "Spectral gain hole–burning at 1.53 $\mu$m in eribum–doped fiber amplifiers", IEEE Photonics Technology Letters, vol. 2, No. 4, April 1990, pp. 246–248.

Desurvive et al., "Study of dependence of gain saturation an effect of inhomogeneous broadening in eribum–doped aluminosilicate fiber amplifiers", IEEE Photonics Technology Letters, vol. 2, No. 9, Sept. 1990, pp. 653–655.

Yoshikuni et al., "Multielectrode distributed feedback laser for pure frequency modulation and chirping suppressed amplitude modulation", Journal of Lightwave Technology, vol. LT–5, No. 4, April 1987, pp. 516–522.

Giles et al., "Simultaneous Wavelength–Stabilization of 980nm Pump Lasers", IEEE Photonics Technology Letters, vol. 6, No. 8, Aug. 1994, pp. 907–909.

Morkel et al., "Wavelength Stability of $Nd^{3+}$–Doped Fibre Fluorescent Sources", Electronics Letters, vol. 26, No. 13, Jun. 21, 1990, pp. 873–875.

Lidgard et al., "Output saturation characteristics of erbium–doped firber amplifiers pumped at 975nm", Applied Physics Letter 56 (26), Jun. 25, 1990, pp. 2607–2609.

Suzuki et al., "Pumping wavelength dependence on gain factor of a 0.98$\mu$m pumped $Er^{3+}$fiber amplifier", Applied Physics Letters, 55, No. 25, Dec. 1998, pp. 2573–2575.

Zyskind et al., "Determination of Homogeneous Linewidth by Spectral Gain Hole–Burning in an Erbium–Doped Fiber Amplifier with $GeO_2:SiO_2$ Core", IEEE Photonics Technology Letters, vol. 2, No. 12, Dec. 1990, pp. 869–871.

M. Tachibana et al., "Erbium–doped fiber amplification with flattened gain spectrum," IEEE *Photonics Technology Letters*, vol. 3, pp. 118–120.

J. Nilsson et al., "Erbium–doped fiber amplifier with dynamic gain flatness for WDM," *Electronic Letters*, vol. 31, pp. 1578–1579, 1995.

C.R. Giles et al., "Spectral dependence of gain and noise in Erbium–doped fiber amplifiers," IEEE *Photonics Technology Letters*, vol. 2, pp. 797–800, 1990.

N.E. Jolley et al., "Out–of–band electronic gain clamping for a variable gain and output power EDFA with low dynamic gain tilt," in Conference on Optical Fiber Communication, 1997 OSA Technical Digest Series, vol. 6, pp. 134–135.

Desurvive, "Erbium–Doped Fiber Amplifiers", 1994, pp. 480–487.

Semenkoff, et al., "Improvement of gain flatness of optical fluoride fiber amplifiers for multiwavelength transmission", 1995, Journal of Non–Crystalline Solids, vol. 184, pp. 240–243.

Lee, et al., "Temperature dependent distortion of multichannel gain flatness for amplifiers", OFC'98 Technical Digest, Feb. 22, 1998, vol. 2.

* cited by examiner

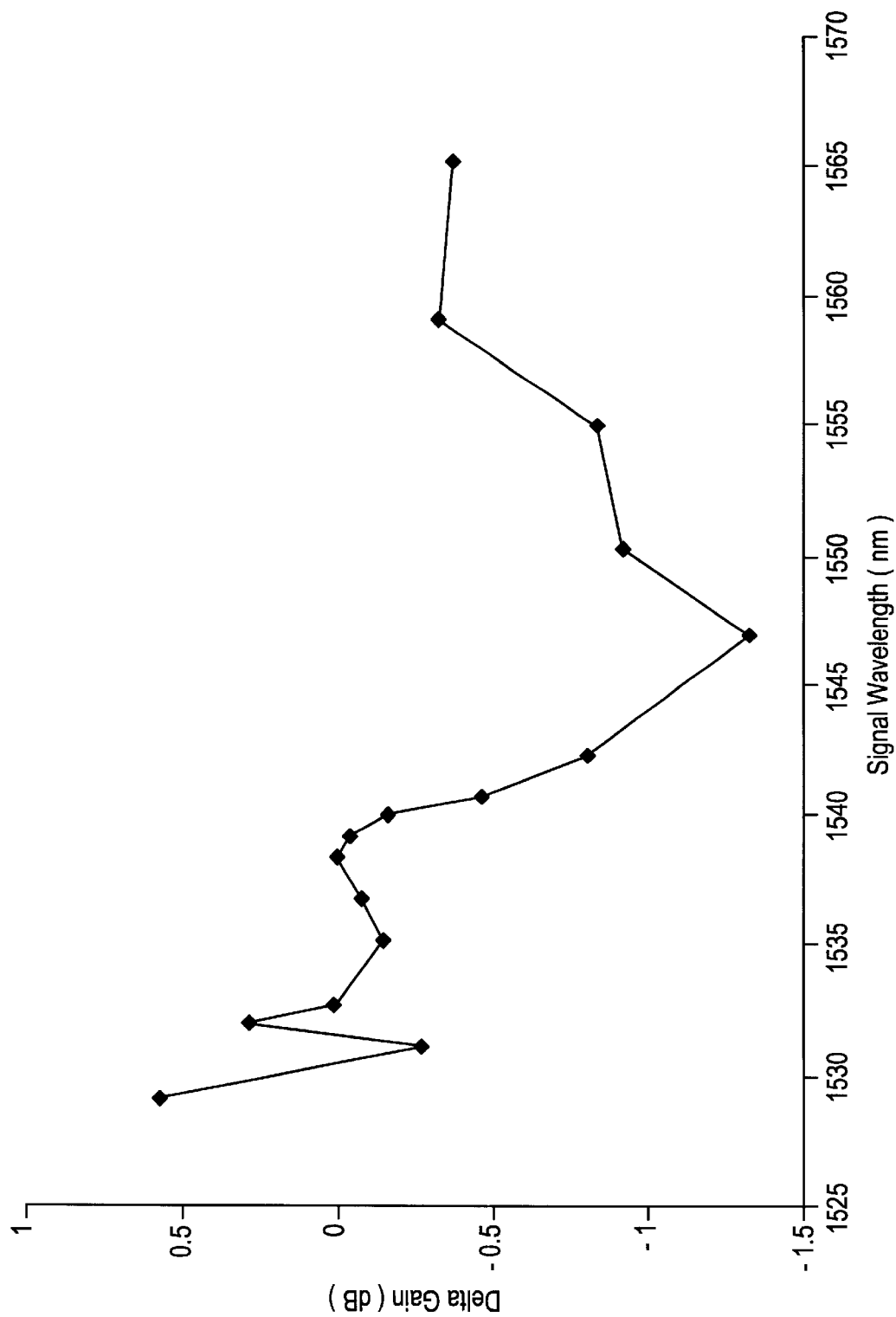

THERMAL TUNING OF OPTICAL AMPLIFIERS AND USE OF SAME IN WAVELENGTH DIVISION MULTIPLEXED SYSTEMS

This application claims benefit of provisional application 60/091,178, filed Jun. 30, 1998.

REFERENCE TO RELATED APPLICATION

In certain of its aspects, the present invention is related to co-pending Bennett et al. U.S. application Ser. No. 09/016, 184, entitled "Pump Wavelength Tuning Of Optical Amplifiers And Use Of Same In Wavelength Division Multiplexed Systems," which was filed on Jan. 30, 1998. In the discussion which follows this related, co-pending application, the contents of which are incorporated herein by reference in their entirety, will be referred to as the "Pump Wavelength Tuning Application."

FIELD OF THE INVENTION

This invention relates to optical amplifiers used in lightwave transmission systems. More particularly, the invention relates to controlling variations in the gain spectrum of an optical amplifier as a result of changes in the amplifier's operating conditions.

OPTICAL AMPLIFIERS

The basic elements of a communication system are a transmitter, a receiver, and a transmission medium. Optical fibers are today the transmission medium of choice for sending voice, video, and data signals over long distances. Although modern fibers have very low losses per unit length, long fiber spans, e.g., cables extending from one city to another, require periodic amplification of the transmitted signal to ensure accurate reception at the receiver.

Erbium doped fiber amplifiers have been developed to satisfy this need for signal amplification. Such amplifiers consist of a length of optical waveguide fiber, e.g., 5 to 30 meters of fiber, which has been doped with erbium. The quantum mechanical structure of erbium ions in a glass matrix allows for stimulated emission in the ~1500 to ~1600 nanometer range, which is one of the ranges in which optical waveguide fibers composed of silica exhibit low loss. As a result of such stimulated emission, a weak input signal can achieve more than a hundred fold amplification as it passes through a fiber amplifier.

To achieve such stimulated emission, the erbium ions must be pumped into an excited electronic state. Such pumping can take place in various pump bands, the most effective of which include those having midpoint wavelengths of ~980 nanometers and ~1480 nanometers. Efficient semiconductor laser sources are available for both of these pump bands. As would be expected, trade-offs exist between these pump bands, with the 980 band providing lower noise in the amplified signal and the 1480 band providing a lower propagation loss for the pump light, which is of value when remote pumping is to be performed.

Although stimulated emission occurs throughout the 1500 to 1600 nanometer range, the amount of amplification achieved is not uniform throughout this range. As a result, optical amplifiers have a "gain spectrum," representative examples of which are shown in FIG. 4. These variations in gain as a function of signal wavelength produce problems in wavelength division multiplexed (WDM) systems where a group of wavelengths are used to simultaneously transmit multiple signals down an optical fiber. Such multiplexing is of great commercial value since it allows significantly increased transmission capacity per fiber. Indeed, a current priority in the telecommunications industry is to upgrade existing one wavelength transmission systems to a multi-wavelength environment in a cost effective manner so as to address the ever increasing demand for greater signal carrying capacity.

In a typical application, a multi-wavelength signal carried on an optical fiber will be subjected to repeated rounds of amplification as it passes from the transmitter to the receiver. At each such stage, any differences in amplification which may exist at the various wavelengths will compound, with the wavelengths subject to more amplification becoming ever stronger at the expense of those subject to less amplification. Various approaches have been used in the art to address this non-uniform amplification problem.

One of the most basic approaches involves the selection of the wavelengths used to transmit the multiple signals. As is well known in the art, the gain spectrum of an erbium doped fiber amplifier is flatter in the "red band," i.e., in the longer wavelength region from about 1540–1545 nanometers to about 1565 nanometers, than in the "blue band," i.e., in the shorter wavelength region from about 1525 nanometers to about 1535–1545 nanometers. In particular, a very flat gain in the red band can be achieved by adjusting the fraction of erbium ions in the excited ("inverted") state through the selection of the length of the fiber amplifier and the level of pumping applied to the fiber.

To take advantage of this flatness, wavelength multiplexed systems employing erbium doped fiber amplifiers have had their signal channels in the red band. In addition, to address residual non-uniform gain, the signal input powers at the transmitter have been adjusted to take account in advance of the differential amplification which will occur as the signal is repeatedly amplified during its passage to the receiver.

To expand the useable wavelength range provided by erbium doped fiber amplifiers into the blue band, filters have been proposed to flatten the amplifier's gain spectrum. The standard assumption which is made in designing a practical filter for this purpose is that the gain of the amplifier is essentially "homogeneous" in character, i.e., that the gain can be described by the homogeneous model discussed in, for example, C R Giles, et al., "Modeling erbium-doped fiber amplifiers", *J Lightwave Tech*, vol. 9, pp. 271–283, 1991, and C R Giles, et al., "Optical amplifiers transform long-distance lightwave telecommunications", *Proc IEEE*, vol. 84, pp. 870–883, 1996. The essence of this assumption is that the gain of an amplifier is determined by the average inversion of the active species, e.g., the erbium ions in an erbium doped fiber amplifier, irrespective of the particular signal wavelengths, signal powers, pump wavelength, and pump power which produced that average inversion. Looked at another way, the assumption of homogeneous broadening means that if the gain at any one wavelength is by some means stabilized to a particular value then a gain at the other wavelengths is similarly stabilized (the stabilized value of the gain being different at different wavelengths).

By means of this assumption, a gain spectrum for an amplifier is calculated for a given average inversion and that gain spectrum is used to design a filter which can flatten the spectrum. A set of signal wavelengths when applied to the amplifier will then see a flattened gain spectrum provided that the average inversion in the presence of those signal wavelengths is the average inversion used in the design of the filter. The degree of flattening will, of course, depend on how well a manufactured filter actually has the desired attenuation spectrum.

Rather than calculating the gain spectrum using the homogeneous model, one could, for example, measure the gain spectrum of an actual amplifier and use that measured gain spectrum to design the filter. This empirical approach, however, also implicitly adopts the homogeneous model in that it is assumed that the gain spectrum will be flattened for any set of signal wavelengths and powers within the amplifier's operating range that has the same average inversion as that which existed when the empirical gain spectrum was measured.

The above approaches for implementing a gain flattening filter work well for signal wavelengths in the red band. However, as discussed in detail in the above-referenced Pump Wavelength Tuning Application, it has been found that the homogeneous model does not work well in the blue band. Rather, this band exhibits substantial inhomogeneous behavior. Specifically, when at least one signal wavelength is in this band, the gain spectrum can no longer be described by a single average inversion which applies to all active species.

The Pump Wavelength Tuning Application discloses various techniques for adjusting the gain spectrum of an optical amplifier, including the portion of the spectrum which lies in the blue band. Those techniques involve controlling the wavelength at which pump power is applied to the amplifier's amplifying medium, e.g., the amplifier's erbium doped fiber.

The present invention provides additional techniques for adjusting an amplifier's gain spectrum. These techniques involve controlling the temperature of the amplifying medium based on the inversion level of the medium. This additional variable in combination with those previously known allows for even better control of the shape of the gain spectrum thus making optical amplifiers even more useful in WDM systems.

GAIN TILT IN WDM TRANSMISSION SYSTEMS

In general terms, the gain spectrum $G(\lambda)$ of an optical amplifier is a function of a variety of variables:

$$G(\lambda)=G(P_{\lambda 1}, P_{\lambda 2}, \ldots P_{\lambda n}, P_p, \lambda_p, I, T, V_1, V_2, \ldots V_n)$$

where:
(a) $P_{\lambda 1}, P_{\lambda 2}, \ldots P_{\lambda n}$ are the input powers at the signal wavelengths $\lambda_1$ through $\lambda_n$, which signal wavelengths may themselves vary from application to application and thereby affect the gain spectrum;
(b) $P_p$ and $\lambda_p$ are the pump power and pump wavelength, the effect of pump wavelength on the gain spectrum being the subject of the Pump Wavelength Tuning Application;
(c) I is the average inversion of the fiber and is itself a function of the input powers and the pump power, as well as the length of the fiber;
(d) T is the temperature of the amplifier's amplifying medium, the effect of the amplifying medium's temperature on the gain spectrum being the subject of the present invention; and
(e) $V_1, V_2, \ldots V_n$ represent other variables, now known or subsequently discovered, which affect the gain spectrum.

The above expression assumes a single pump laser and a single stage amplifier. Corresponding expressions can be written for a fiber pumped by multiple lasers and/or for multi-stage amplifiers.

In WDM systems that employ optical amplifiers in their transmission paths, the phenomenon of "gain tilt" presents problems. Gain tilt is the term used in the art to describe the fact that under different operating conditions, an optical amplifier will amplify different channels to different relative extents. Although various changes in operating conditions can be considered, a particularly important change is that which occurs when the level of signal power at one, some, or all of the signal wavelengths changes, i.e., when one or more of the $P_{\lambda 1}, P_{\lambda 2}, \ldots P_{\lambda n}$ values change. For example, the signal power at all of the signal wavelengths will change as the distance between amplifiers along a transmission line changes, e.g., the power will go down as the distance increases.

For the simplest case of a two channel system, the gain tilt (GT) between operating condition O1 and operating condition O2 can be written:

$$GT_{O1 \to O2}(\lambda_1, \lambda_2) = \Delta G_{O1 \to O2}(\lambda_1)/\Delta G_{O1 \to O2}(\lambda_2)$$

where $\Delta G_{O1 \to O2}(\lambda_1)$ and $\Delta G_{O1 \to O2}(\lambda_2)$ are, respectively, the changes in gain at $\lambda_1$ and $\lambda_2$ in going from operating condition "1" to operating condition "2" and the units of gain tilt are dB/dB.

A gain tilt of 1.0 means that the change in gains at $\lambda_1$ and $\lambda_2$ are the same so that if the gain spectrum of the amplifier was substantially flat (i.e., substantially free of ripple) for signals at $\lambda_1$ and $\lambda_2$ for operating condition "1", it will also be substantially flat for operating condition "2".

In practice, however, the gain tilt is not equal to 1.0. Rather, it is often found that a change in operating conditions results in an increase in gain for some wavelengths (e.g., shorter wavelengths) relative to other wavelengths (e.g., longer wavelengths). That is, a plot of $G(\lambda)$ versus $\lambda$ appears to have undergone a rotation (a "tilting") in either a clockwise direction (if the gain at shorter wavelengths is increased relative to the gain at longer wavelengths) or counterclockwise direction (if the gain at longer wavelengths is increased relative to the gain at shorter wavelengths) as a result of the change in operating condition. Hence the name "gain tilt." (Note that in the general case, in addition to a rotation, the plot of $G(\lambda)$ versus $\lambda$ can undergo a net upward or downward shift along the vertical gain axis as a result of the change in operating conditions. Also, localized changes at particular wavelengths can occur, i.e., more or less ripple can be introduced into the gain spectrum.)

Rotation of the gain spectrum with a change in operating conditions is a problem in WDM systems since any passive system that is designed to equalize the power output of the channels for one specific set of operating conditions is liable to fail to provide equalization when those conditions are changed. One of the aspects of the present invention involves minimizing this adverse effect of the gain tilt phenomenon.

EFFECTS OF TEMPERATURE ON ERBIUM-DOPED FIBERS

Studies of the effects of temperature on erbium-doped fibers can be found in the following references: Kagi et al., "Temperature Dependence of the Gain in Erbium-Doped Fibers," *Journal of Lightwave Technology,* 1991, 9:261–265; Kemtchou et al., "Comparison of Temperature Dependencies of Absorption and Emission Cross-sections in Different Glass Hosts of Erbium-Doped Fibers," *OSA TOPS* on *Optical Amplifiers and Their Applications*, 1996, 5:129–132; Kemtchou et al., "Temperature dependence of the gain in erbium-doped fiber amplifiers—Comparison between silica and fluoride fibers," Proc. of the Opt. Soc. of America, Opt. Amplif. and Their Applications Mtg., July 1997, Victoria, Canada, MB5:22–25; Kemtchou et al., "Gain Temperature Dependence of Erbium-Doped Silica and Fluoride Fiber Amplifiers in Multichannel Wavelength-Multiplexed Transmission Systems," *Journal of Lightwave Technology*, 1997, 15:2083–2090; Lumholt et al., "Gain Variations for an Erbium Doped Fiber Amplifier in a Temperature-Range from 45K to 320K," *Journal of Optical Communications*, 1992, 13:114–116; Suyama et al., "Temperature Dependent Gain and Noise Characteristics of a 1480 nm-Pumped Erbium-Doped Fibre Amplifier," *Electronics Letters*, 1990, 26:1756–1757; Yamada et al., "Temperature Dependence of Signal Gain in $ER^{3+}$-Doped Optical Fiber Amplifiers," *IEEE Journal of Quantum Electronics*, 28:640–649; and Yamada et al., "Temperature Insensitive $E^{3+}$-Doped Optical Fibre Amplifiers," *Electronics Letters*, 1990, 20:1649–1650.

Significantly, with regard to the present invention, these studies view the temperature sensitivity of erbium-doped fibers as a problem which must be overcome in deploying optical amplifiers in the field where wide swings in ambient temperature can occur. In addition, various of the references vary fiber length in studying the effects of temperature. All other things being equal, a change in fiber length changes average inversion. Moreover, in accordance with the invention, it has been found that a change in fiber length changes the magnitude of the temperature effect, i.e., for a constant average inversion, the effects of a change in temperature are cumulative on a meter-by-meter basis over the length of the fiber. Thus, by changing fiber length, the references complicate the relationship between fiber temperature and fiber gain and thereby camouflage the effects of inversion per se.

Accordingly, none of the references recognizes that the effect of temperature on the gain spectrum of an erbium-doped fiber depends on the fiber's inversion level. Lacking an understanding of how the temperature effect can be controlled, the references do not disclose or suggest using temperature as a means for adjusting the shape of the gain spectrum of an optical amplifying medium.

SUMMARY OF THE INVENTION

In view of the foregoing, it is an object of the invention to provide improved optical amplifiers for use in lightwave transmission systems, e.g., optical waveguide communications systems. More particularly, it is an object of the invention to provide improved optical amplifiers for use in wavelength division multiplexing systems.

To achieve these and other objects, the invention provides an optical amplifier, e.g., an erbium doped fiber amplifier pumped in the 980 nm and/or 1480 nm bands and amplifying in the 1525 to 1570 nm band, wherein the temperature of at least a portion of the amplifier's amplifying medium is controlled to compensate for changes in the shape of the amplifier's gain spectrum as a result of a change in at least one of the amplifier's operating conditions other than said temperature.

For example, the temperature can be used to compensate for changes in the input power at one, some, or all of the signal wavelengths. It can also be used to compensate for a change in the wavelength of one or more of the inputted signals. Similarly, compensation can be provided for changes in pump power and/or pump wavelength.

The compensation is preferably performed based on the inversion level of the portion of the amplifying medium whose temperature is changed. Specifically, in accordance with the invention, it has been determined that for an amplifying medium having a relatively high average inversion, an increase in temperature results in a decrease in gain in the blue band (e.g., a decrease in the wavelength range from about 1529 nm to about 1545 nm) and an increase in gain in the red band (e.g., an increase in the wavelength range from about 1545 nm to about 1565 nm). For an amplifying medium having a relatively low average inversion level, the opposite effect is seen, i.e., an increase in temperature results in an increase in gain in the blue band and a decrease in the red band. In general terms, the effect of temperature on the gain spectrum is greater in the red band than in the blue band for both the highly inverted and the less highly inverted cases.

For intermediate levels of inversion, the changes in the gain spectrum with changes in the amplifying medium's temperature are minimized. In accordance with other aspects of the invention, this effect is used to produce an optical amplifying medium or a portion thereof which is substantially athermalized, i.e., the level of inversion of the amplifying medium or portion thereof is selected to have a value which reduces the effects of a change in temperature on the shape of the gain spectrum.

For a simple single stage optical amplifier, average inversion levels can be determined using measured gain spectra, emission coefficients, and absorption coefficients as illustrated below in Example 2. Similarly, average inversion levels for the entire amplifier can be determined for more complex multi-stage optical amplifiers. Numerical values for the average inversion of specific stages of a multi-stage amplifier, however, are in general difficult to determine since the individual stages of such amplifiers are not normally readily accessible. Also, the numerical values corresponding to high, low, and intermediate levels of inversion will in general vary with the specific composition of the amplifying medium.

High, low, and intermediate levels of inversion, however, do have distinguishing spectral gain characteristics. Thus, a fiber which has a relatively high level of inversion will have a gain in the blue band which is substantially higher than the gain in the red band; a fiber which has a relatively low level of inversion will have a gain in the blue band which is equal to or less than the gain in the red band; and a fiber which has an intermediate level of inversion will have a gain in the blue band which is only somewhat greater than the gain in the red band, the difference between the bands being less than that for a high inversion fiber. These qualitative properties of high, low, and intermediate levels of inversion are used in the following discussions of thermal tuning and in the appended claims.

Instead of using temperature to compensate for changes in the gain spectrum due to changes in pump power and/or pump wavelength, the effects of a change in the temperature of the amplifying medium can be combined with the effects of a change in pump power and/or pump wavelength to deal with gain spectrum changes caused by changes in other operating conditions, e.g., signal powers and/or wavelengths.

When combined together, the variables of amplifying medium temperature, average inversion, pump wavelength, and/or pump power provide the designer and/or user of optical amplifiers with a wide range of controls to deal with variations in optical amplifier performance as a result of a change in operating conditions. These controls can operate either passively, wherein the values of the control variables are selected in advance to provide compensation for changes in operating conditions expected to occur in the field, or actively, wherein the values of the control variables are adjusted based on a feedback loop which monitors changes in operating conditions. Examples of such active and passive control can be found in the above referenced Pump Wavelength Tuning Application.

The above approaches to controlling the behavior of an optical amplifier under different operating conditions is especially applicable to multi-stage optical amplifiers. In this case, the control variables of amplifying medium temperature, average inversion, pump wavelength, and/or pump power can be applied individually to the various stages of the amplifier. In this way, even more effective control of the shape of the gain spectrum can be achieved.

Typically, the thermal tuning techniques of the invention will involve controlling the temperature of all or a portion of the amplifier's amplifying medium over a temperature range from about −20° C. to about 100° C., preferably from about 0° C. to about 80° C., and most preferably from about 25° C. to about 70° C., although temperatures outside of these ranges can be used if desired. Control can be applied to the entire length of the amplifying medium or to just a portion thereof, provided the portion is large enough to achieve the desired effect(s) on the shape of the amplifier's gain spectrum.

If desired, different portions of an amplifying medium can be fixed at different temperatures. Similarly, in the case of a multi-stage amplifier, control can be applied to all stages or just selected stages, where again, within any one stage, the entire amplifying medium or just portions thereof can be subject to temperature control.

A thermoelectric cooler employing the Peltier effect or similar device can be used to achieve the desired temperature control. In general terms, a preferred level of temperature control for the practice of the invention is to within about ±5° C. This level of temperature control can be readily achieved with a thermoelectric cooler.

The initial set point for the temperature can be essentially anywhere within the amplifying medium's operative range of temperatures, e.g., at the middle of the operative range or near (at) one of the extremes. The choice of initial set point will typically be made based on the changes in operating conditions expected to occur during use of the optical amplifier as well as the expected in-use inversion level of the amplifying medium whose temperature is being controlled.

For example, if an expected change in operating condition is known to cause a clockwise gain tilt, e.g., if the expected change in operating conditions is an increase in pump power which is known to produce a clockwise rotation of the gain spectrum, then for the case of a high inversion amplifying medium, a relatively low initial temperature will be selected so that the temperature can be increased when the change in operating condition occurs. Such an increase in temperature will produce a counterclockwise gain tilt (see, for example, FIGS. 4–6 below) and thus compensate for the clockwise tilt caused by the change in operating condition. For a low inversion amplifying medium, on the other hand, a high initial temperature is chosen so that a counterclockwise gain tilt can be achieved by lowering the temperature (see, for example, FIGS. 7 and 8 below). In either case, the combined effect of increasing the pump power and adjusting the temperature of the amplifying medium will be a substantially achromatic increase in the gain of the amplifier. If the expected change is in the opposite direction, e.g., if the expected change is a decrease in pump power, then the opposite initial set points will be chosen based on the inversion level of the amplifying medium.

It should be noted that in selecting the initial temperature of the amplifying medium, other amplifier variables, e.g., pump wavelength, and/or other amplifier components, e.g., the amplifier's gain flattening filter, are used to compensate for undesired effects on the shape of the initial gain spectrum resulting from the choice of initial temperature. That is, the overall amplifier design process takes into account both the desired gain spectrum under the initial operating conditions and the desired gain spectrum under the changed operating conditions and selects amplifier components and the values of control variables to achieve, as best as possible, the desired gain spectra, both initially and during subsequent use of the amplifier.

In the foregoing discussion and that which follows, the following terms are used in the following ways: (1) the phrase "shape of an amplifier's gain spectrum" is used in its broadest sense and is intended to cover any and all aspects of a gain versus wavelength plot, including, without limitation, the overall orientation (tilt) of the plot, the average gain for the plot, and the values of the gain at specific wavelengths; and (2) the term "average inversion" of an amplifying medium or a portion thereof means the fraction of the active species, e.g., erbium atoms, which are in a state from which emission in the signal band can be stimulated.

BRIEF DESCRIPTION OF THE DRAWINGS

There follows a description of optical amplifiers and wavelength division multiplexed (WDM) transmission systems embodying certain preferred but non-limiting forms of the invention. The description refers to the accompanying drawings in which:

FIG. 12 plots delta gain (i.e., G(75° C.)–G(35° C.)) for the data of FIG. 11. The gain spectrum of this fiber behaves similar to the gain spectrum of the fiber of coil 20b, the average inversion levels of the two fibers being similar.

FIG. 19 shows the variation with pump wavelength for coil temperatures of 25° C., while FIG. 20 shows the variation at 75° C. FIG. 20 can be seen to be a superposition of FIG. 19 and FIG. 13. The diamond, square, triangular, "x", "*", and circle data points in FIGS. 19 and 20 are for pump wavelengths of 974, 976, 978, 980, 982, and 985 nanometers, respectively, for pumps 21a, 21d, and 21e in FIG. 2.

FIG. 21 plots delta gain (i.e., G(75° C.)–G(25° C.)) for the 980 nm data of FIGS. 20 and 21.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DETAILED DESCRIPTION OF THE INVENTION

As discussed above, the present invention relates to the control of the shape of an amplifier's gain spectrum by controlling the temperature and inversion level of all or a portion of the amplifier's amplifying medium. By this approach, the shape of the gain spectrum can be adjusted to achieve desired amplification levels at a desired set of signal wavelengths and powers.

The invention can be practiced during the design/manufacture of an amplifier, or in real time as the amplifier is being used, or both during design/manufacture and in real time. When used in real time, the temperature or temperatures of the amplifying medium are set either manually or automatically based on the current operating conditions for the amplifier. When used during the design/manufacturing stage, the temperature or temperatures of the amplifying medium are chosen to achieve or facilitate the achievement of desired in-use gain spectra.

For example, users of optical amplifiers may desire to use a particular amplifier with multiple sets of signals having different wavelengths and/or different signal powers. In such a case, amplifier performance can be optimized in real time by changing the amplifying medium temperature or temperatures as the set of signals is changed. Alternatively, a compromise temperature or set of temperatures can be chosen which, although not optimum for all or any of the sets of signals with which the amplifier is to be used, provides adequate performance for those sets without the need for in-the-field adjustment.

The invention can be used with a variety of optical amplifier designs. In all cases, the amplifier will include at least one amplifying medium and at least one pump, and may optionally include at least one gain flattening filter. Preferred amplifying media are rare earth doped materials, e.g., erbium doped glasses. The amplifying medium is preferably configured as a waveguide, e.g., as an optical waveguide fiber. The pump is preferably a semiconductor laser operating in the 980 nm or 1480 nm pump band. Simultaneous pumping at 980 and 1480 nm from, for example, opposite ends of an erbium-doped fiber can also be used if desired. The gain flattening filter, when used, can be, for example, an interference filter or a long period grating.

Figure 1:
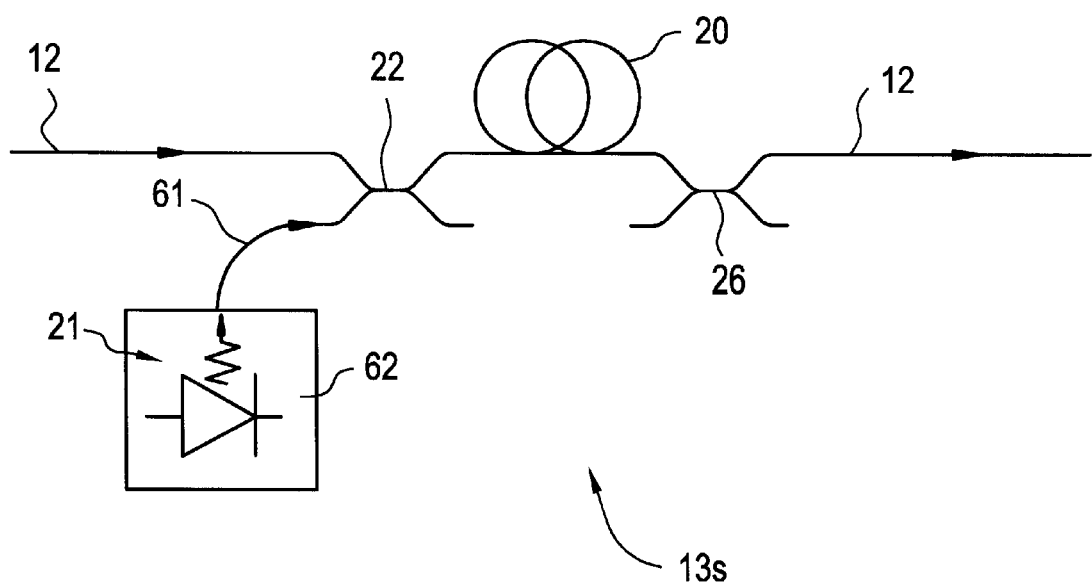
FIG. 1 schematically represents a single stage optical amplifier to which thermal tuning may be applied.

FIG. 1 illustrates a representative single stage optical amplifier 13s with which the invention can be used. The amplifier comprises a length of erbium-doped optical fiber 20 which is coupled through a connector 22 to fiber 12. A light source 21, which can be, for example, a diode-laser 62, provides pump light which is transmitted along a fiber 61 and through the coupler 22 to pump the erbium-doped optical fiber 20. At its output end, the erbium-doped optical fiber 20 is connected through a connector 26 to the continuation of optical fiber 12. In the practice of the invention, the temperatures of all or portions of fiber 20 are controlled to adjust the shape of the amplifier's gain spectrum.

Figure 2:
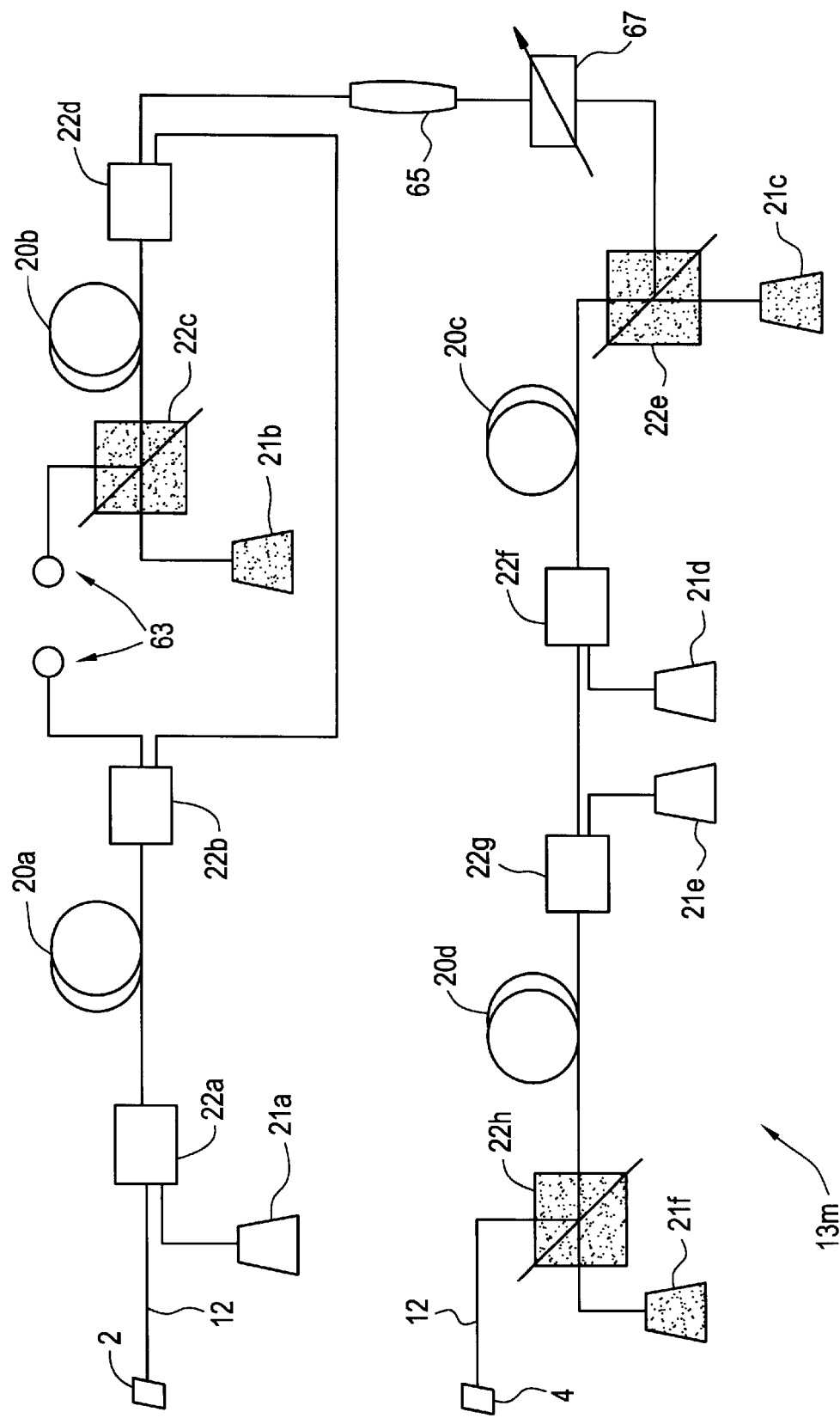
FIG. 2 schematically represents a multi-stage optical amplifier to which thermal tuning may be applied.

FIG. 2 illustrates a representative multi-stage optical amplifier 13m with which the invention may be used. As shown, the amplifier comprises an input port 2, an output port 4, four lengths of erbium-doped optical fiber (20a through 20d), six pumps (21a through 21f), and eight couplers (22a through 22h) which preferably are in the form of wavelength division multiplexers. Pumps 21a, 21d, and 21e can, for example, operate at 980 nm, while pumps 21b, 21c, and 21f operate at, for example, 1480 nm. As shown, amplifier 13m also includes an interstitial access 63 for adding or dropping signals, a gain flattening filter 65, and a variable optical attenuator 67. The gain flattening filter can be, for example, an unpumped erbium-doped fiber having a controlled temperature. In the practice of the invention, the temperatures of all or portions of all or some of fibers 20a through 20d are controlled to adjust the shape of the amplifier's gain spectrum.

Figure 3:
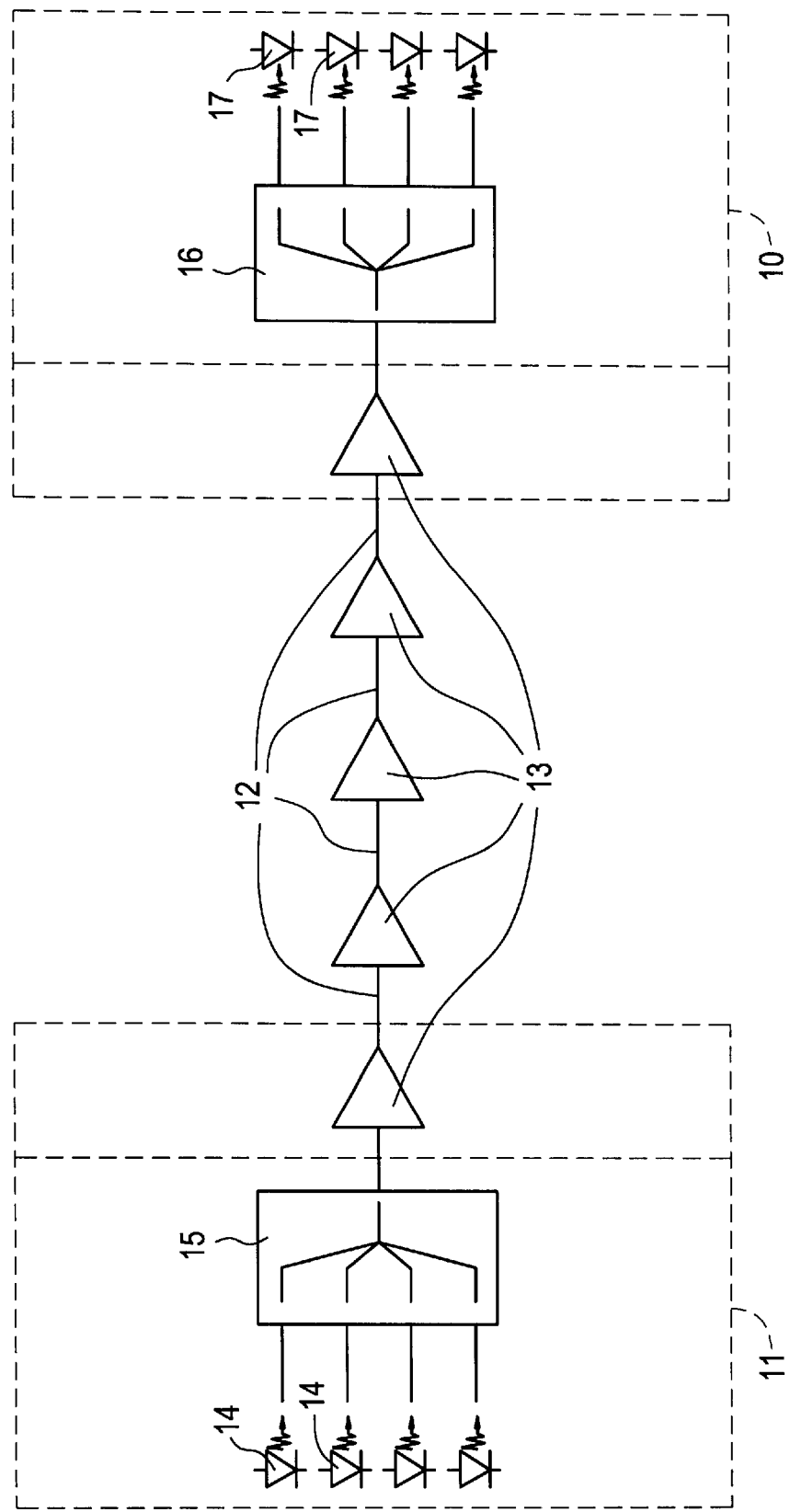
FIG. 3 schematically represents a WDM transmission system having a receiver connected with a transmitter via a transmission path including a concatenation (plurality) of optical amplifiers.

FIG. 3 illustrates a representative optical transmission system in which the invention can be used. As shown therein, a WDM receiver indicated generally at 10 is optically coupled with a WDM transmitter indicated generally at 11 by means of transmission path 12, in the form of an optical fiber that includes a concatenation of optical amplifiers 13 spaced along the fiber to amplify signals transmitted between the transmitter 11 and the receiver 10.

The transmitter 11 has a plurality of data-modulated sources 14 (for convenience of illustration only four such sources are indicated in the figure) operating at different wavelengths, typically in the waveband extending from about 1525 nm to about 1570 nm. Also for simplicity, the invention is described in terms of a receiver and transmitter, whereas of course a pair of transceivers could be used.

The plurality of wavelengths is multiplexed on to the common transmission path 12 by means of a wavelength multiplexer 15. Optionally, the transmitter may include one of the concatenation of amplifiers 13. The receiver has a wavelength demultiplexer 16, the counterpart to the multiplexer 15 of the transmitter. The outputs of the demultiplexer 16 feed the individual demultiplexed signal channels to associated detectors 17. The receiver may similarly include one of the concatenation of amplifiers 13 as a preamplifier located upstream of the demultiplexer.

Each of optical amplifiers 13 can be a single stage or multi-stage amplifier. In accordance with the invention at least some and preferably all of the amplifiers employ thermal tuning so as to minimize differential gain problems for the overall system. For a system which employs real time thermal tuning, the temperature of all or part of the amplifying medium of all or some of amplifiers 13 is dynamically regulated at least in part by a signal derived from a measured operating parameter of the amplifier or of the system.

In particular, a feedback loop can be used for this purpose where the feedback loop may for instance derive its control signal from a measure of the disparity between the power output from the amplifier in one of the multiplexed signal channels and that from at least one other of the channels. The feedback loop can include a look-up table which transforms power disparity values into temperature change values. The values in the look-up table can, for example, be obtained empirically prior to installation of the optical transmission system and interpolation can be used to obtain the requisite temperature values for an operating point between those recorded in the table.

As discussed above, the effects of temperature on the shape of the gain spectrum depend on the average level of inversion of the amplifying medium whose temperature is being changed. Indeed, the effects of a change in temperature can be thought of in terms of, for example, a change in fiber length, all other variables, including temperature, being held constant.

Thus, for an amplifying medium having a sufficiently high inversion, an increase in temperature yields a spectral shape change resembling a reduction in inversion. On the other hand, at sufficiently low inversions, increasing the temperature yields a spectral shape change resembling an increase of the inversion. Moreover, the sensitivity of the gain spectrum to a change in temperature is also dependent on the medium's level of inversion, with a relatively low level of inversion correlating with a relatively high sensitivity. The sign and degree of thermally induced spectral shape change can thus be controlled and maximized or minimized over large wavelength bands by varying the inversion.

As known in the art, the level of inversion of an amplifying medium typically varies over the length of the medium. This variation allows for selective control of the temperature of different portions of the medium to achieve desired effects. For example, athermalization is generally more difficult to achieve for a medium which has an overall low average inversion since, as discussed above, a low average inversion correlates with a high temperature sensitivity. A portion of such a medium, however, will typically have an inversion which makes that portion substantially athermal. Accordingly, athermalization for the overall medium can be achieved by controlling the temperature of the remainder of the medium, i.e., holding its temperature at a constant value, while leaving the naturally athermal portion uncontrolled. Less external energy can thus be used in achieving athermalization since the temperature of only a part of the amplifying medium needs to be controlled.

Rather than holding the thermally sensitive portion of the medium at a constant temperature, the temperature of this portion can be varied to change the shape of the gain spectrum or to compensate for a change in shape resulting from a change in operating conditions. Again, less external energy is required since the temperature of only a portion of the medium is being changed.

More generally, the effects of thermal tuning can be enhanced by selective control of the temperature of different portions of the amplifying medium. Thus, for a medium having a first portion whose average inversion is low and a second portion whose average inversion is high, the thermal tuning effect can be maximized by varying the temperature of the first portion while holding the temperature of the second portion constant. In this way, the effects produced by changes in the temperature of the first portion are not negated by changes in the temperature of the second portion. Rather than holding the temperature of the second portion constant, this portion can simply be left uncontrolled if the changes to the gain spectrum caused by variations in the temperature of this portion as a result of changes in the ambient temperature are small. Even further maximization of the thermal tuning effect can be achieved by making the average inversion level of the first portion very low.

Without intending to limit it in any manner, the present invention will be more fully described by the following examples.

EXAMPLE 1

Multi-Stage Amplifier

The data of this example were obtained using a high output power, long haul, unidirectional amplifier having an architecture of the type shown in FIG. 2. The components of this multi-stage amplifier are set forth in Table 1. Coils 20a, 20b, 20c, and 20d had an erbium concentration of 400–500 ppm, an aluminum concentration of 2% by weight, a numerical aperture of 0.1, a core diameter of 4.6 microns, and a cutoff wavelength between 1125 and 1300 nanometers. Heating and cooling of the coils was performed using a resistance heater temperature controller. A conventional optical spectral analyzer was used to measure the gain spectra of the overall amplifier and the various stages thereof.

The amplifier was designed to have an 80 channel capability, an output power of 22.5 dBm, interstitial access to allow channels to be added or dropped, dynamic gain control and a bandwidth of operation extending from 1529 nm to 1565 nm.

To achieve a gain flatness of less than 1 dB at the output over a band of operation of this extent puts high demands on the amplifier's gain flattening filter. Such a wide band of operation also means that the amplifier is more vulnerable to pump wavelength variations and variations in temperature. The gain flatness can also change as a result of (i) variations in component loss between amplifiers and (ii) the change in gain spectrum resulting from adding or dropping signal channels and the resulting change in inversion.

Coil 20a (i.e., the first stage) is primarily a pre-amplifier where the principal function is to minimize the noise figure performance not only for the first stage itself, but for the entire amplifier in view of the impact that the first stage has on the overall noise performance of the module. Characteristic of a low noise figure is a high front end inversion along the length of the first coil and this means that the average inversion for the first stage is greater than that for the following coils.

The experiments were performed using sixteen lasers discretely placed over the spectral range from 1529 nm to 1565 nm in order to locate the maximum and the minimum peaks throughout the spectrum. The lasers had a total input power of −14.5 dBm in order to satisfy a total output power from the amplifier of 22.5 dBm. In order to monitor the change in the spectrum attributed to a change in temperature for each coil, the gain was fixed at 1538.982 nm by reducing the pump powers accordingly.

Figure 4:
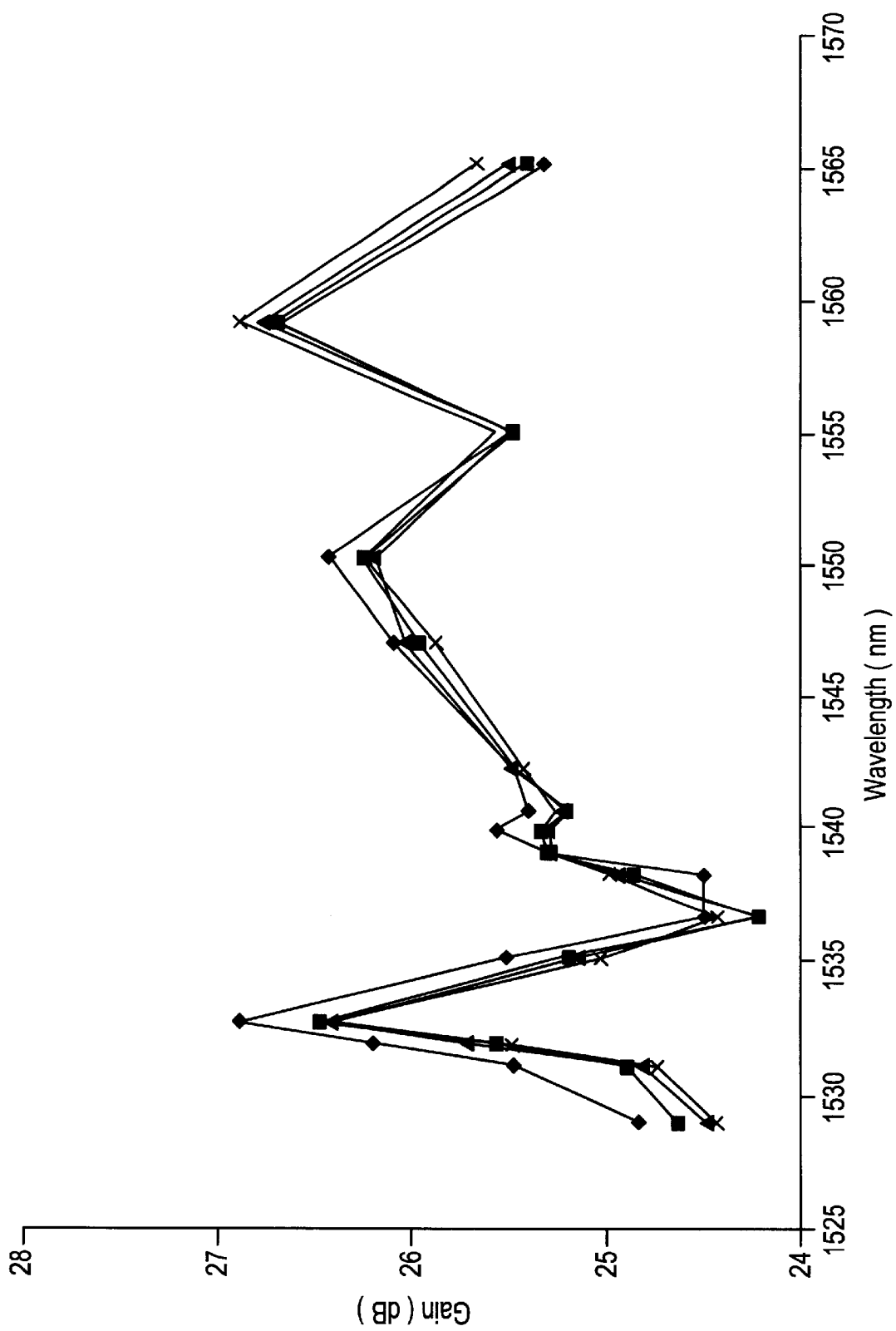
FIG. 4 illustrates the effects of a change in temperature on the shape of the gain spectrum of an erbium-doped fiber having a high average inversion, i.e., coil 20a in FIG. 2. As shown in this figure, increasing the temperature of this fiber tilts the gain spectrum of the amplifier down in the blue band and up in the red. The diamond, square, triangular, and "x" data points are for fiber temperatures of 25° C., 35° C., 50° C., and 75° C., respectively. The gain was fixed at 1538.982 nm for the four temperatures. The gain decrease at 1550 nm over the test range was 0.2 dB.
Figure 5:
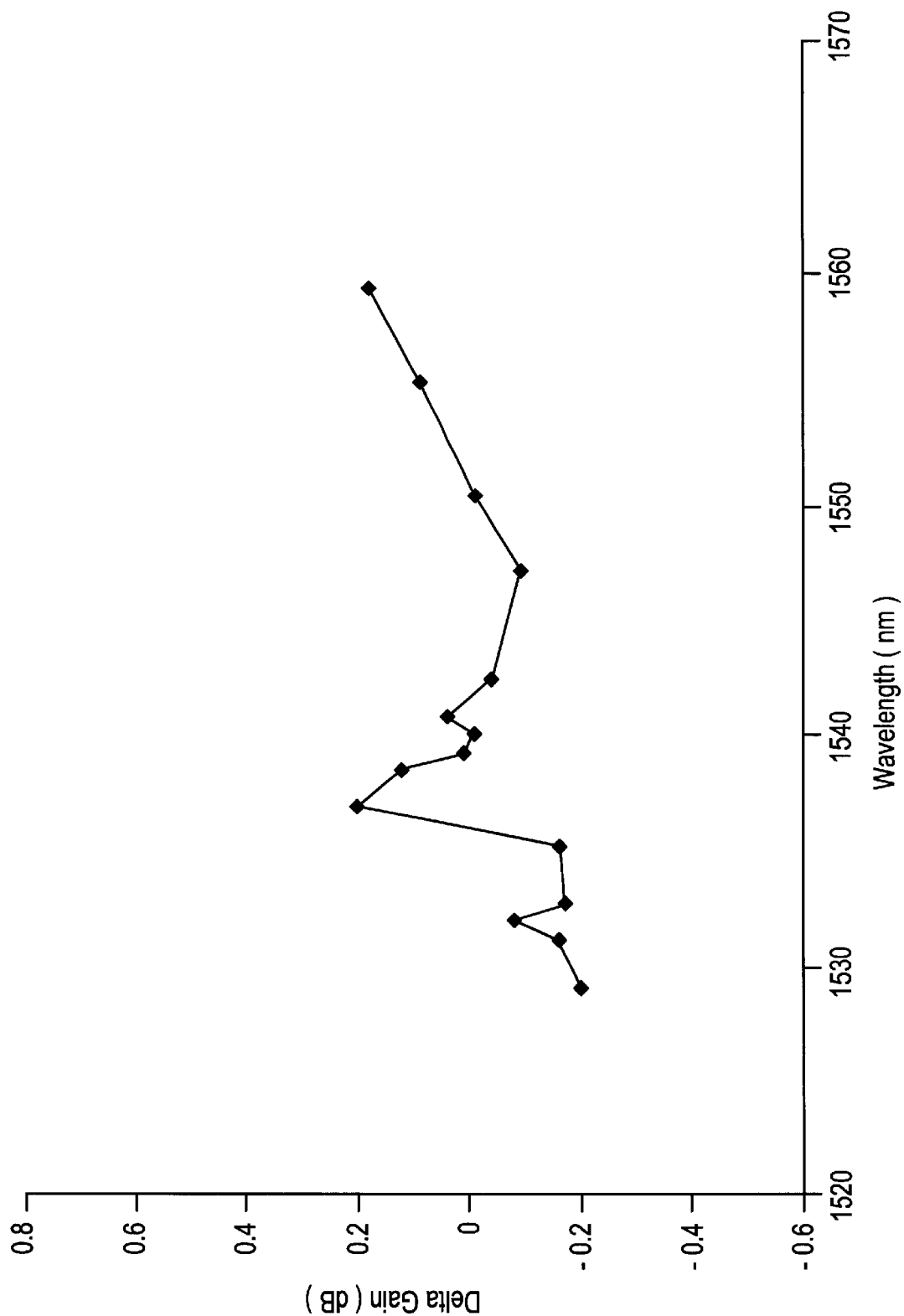
FIG. 5 plots delta gain (i.e., G(75° C.)−G(35° C.)) for the data of FIG. 4.
Figure 6:
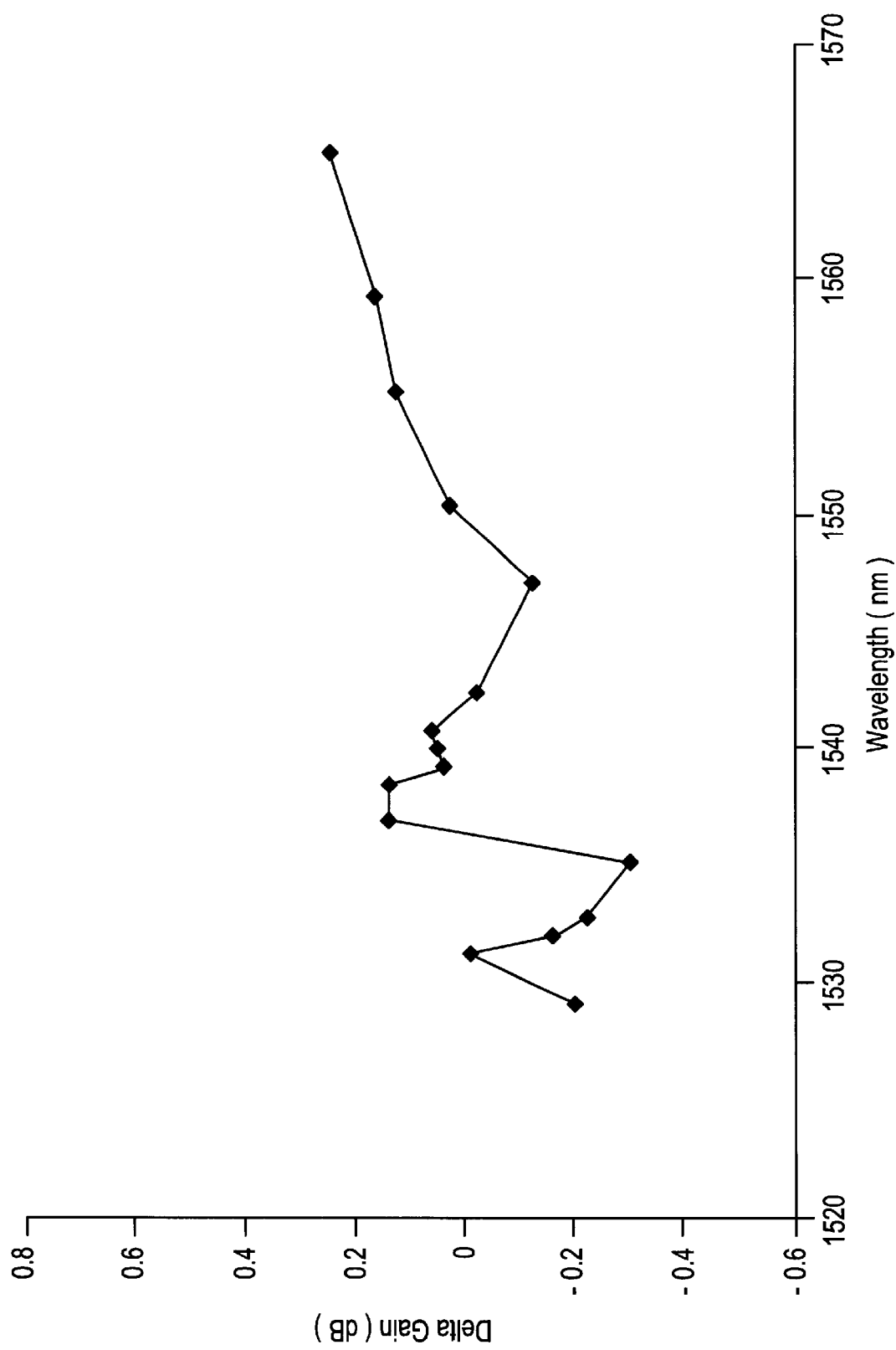
FIG. 6 plots delta gain (i.e., G(75° C.)−G(35° C.)) for the fiber of FIG. 4 but without the gain being fixed at 1538.982 nm.

FIGS. 4 and 5 show the change in gain spectrum as coil 20a was heated from 25° C. to 75° C. As can be seen most clearly in FIG. 5, the trend for this high inversion stage was to tilt the amplifier down in the blue band (1529 nm–1545 nm) and up in the red band (1545 nm–1565 nm). For a wavelength of 1550 nm it is seen that there is a decrease in gain of about 0.2 dB. The experiment was repeated but without fixing the gain at 1538.982 nm. The results are shown in FIG. 6 where the same trends are apparent.

Figure 7:
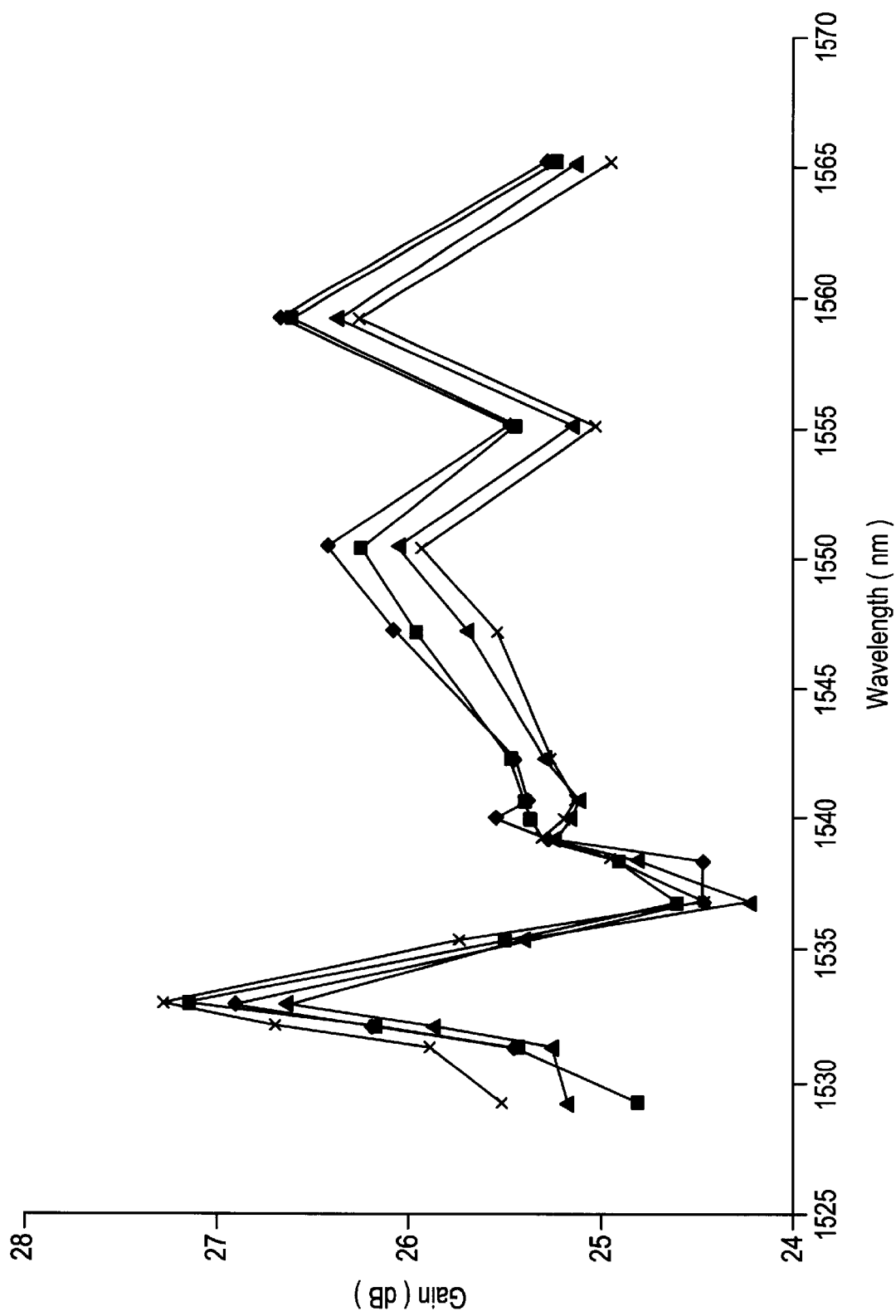
FIG. 7 illustrates the effects of a change in temperature on the shape of the gain spectrum of an erbium-doped fiber having a low average inversion, i.e., coil 20b in FIG. 2. As shown in this figure, increasing the temperature of this fiber tilts the gain spectrum of the amplifier in the opposite sense to coil 20a. The gain spectrum is now increased in the blue band and decreased in the red band. Again, the diamond, square, triangular, and "x" data points are for fiber temperatures of 25° C., 35° C., 50° C., and 75° C., respectively, and the gain was fixed at 1538.982 nm for these four temperatures. In this case, the gain decreases by 0.5 dB at 1550 nm over the test range.
Figure 8:
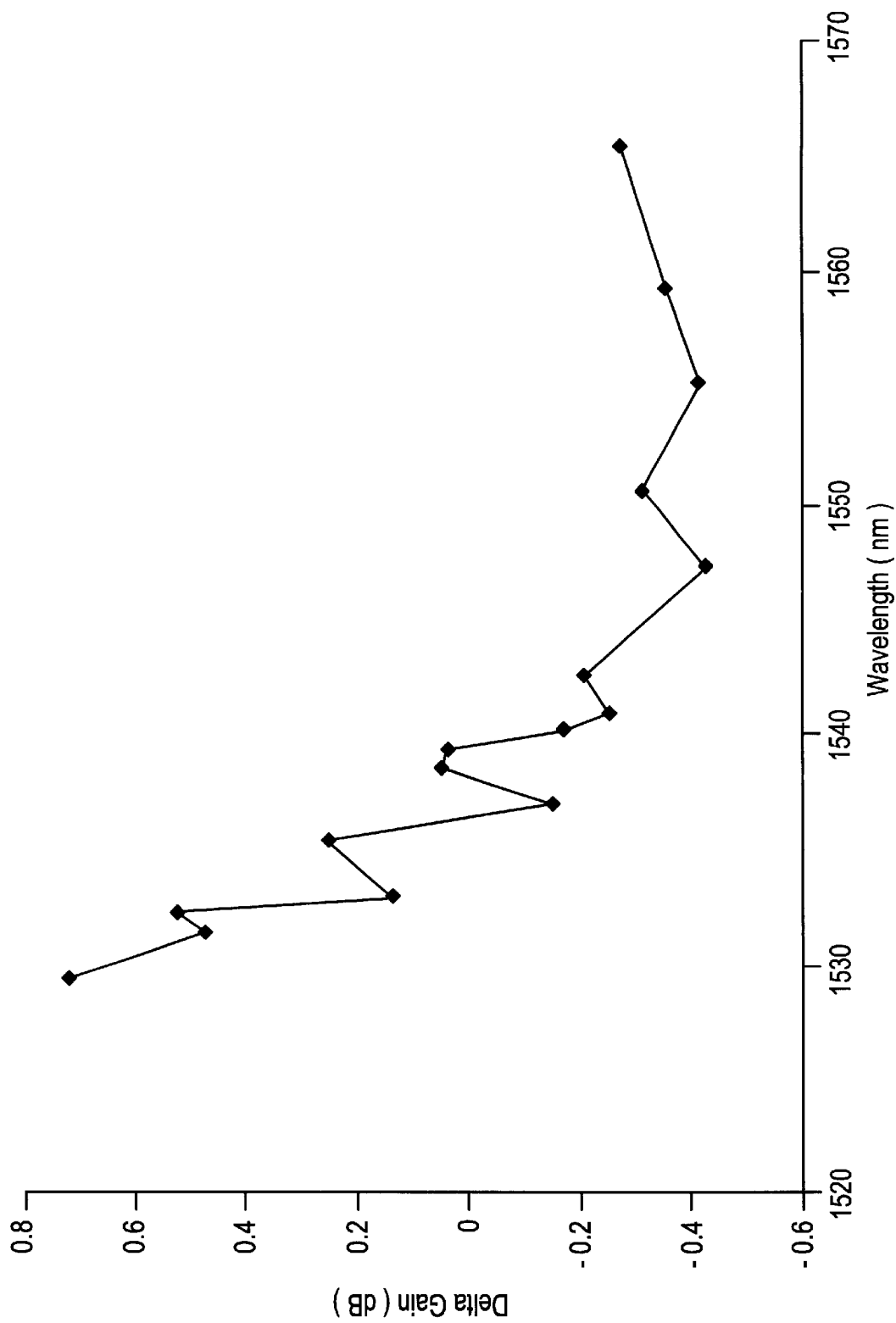
FIG. 8 plots delta gain (i.e., G(75° C.)–G(35° C.)) for the data of FIG. 7.

FIGS. 7 and 8 show the results of performing the 25° C. to 75° C. experiment on coil 20b which has a relatively low inversion. As can be seen in FIG. 8, the impact of temperature in this case is to tilt the gain spectrum in the opposite sense and this time to increase the gain in the blue band and to decrease the gain in the red band. For a wavelength of 1550 nm, the gain is observed to drop by as much as 0.5 dB. A similar curve to that shown in FIG. 8 is obtained when the gain is not fixed at 1538.982 nm.

Figure 9:
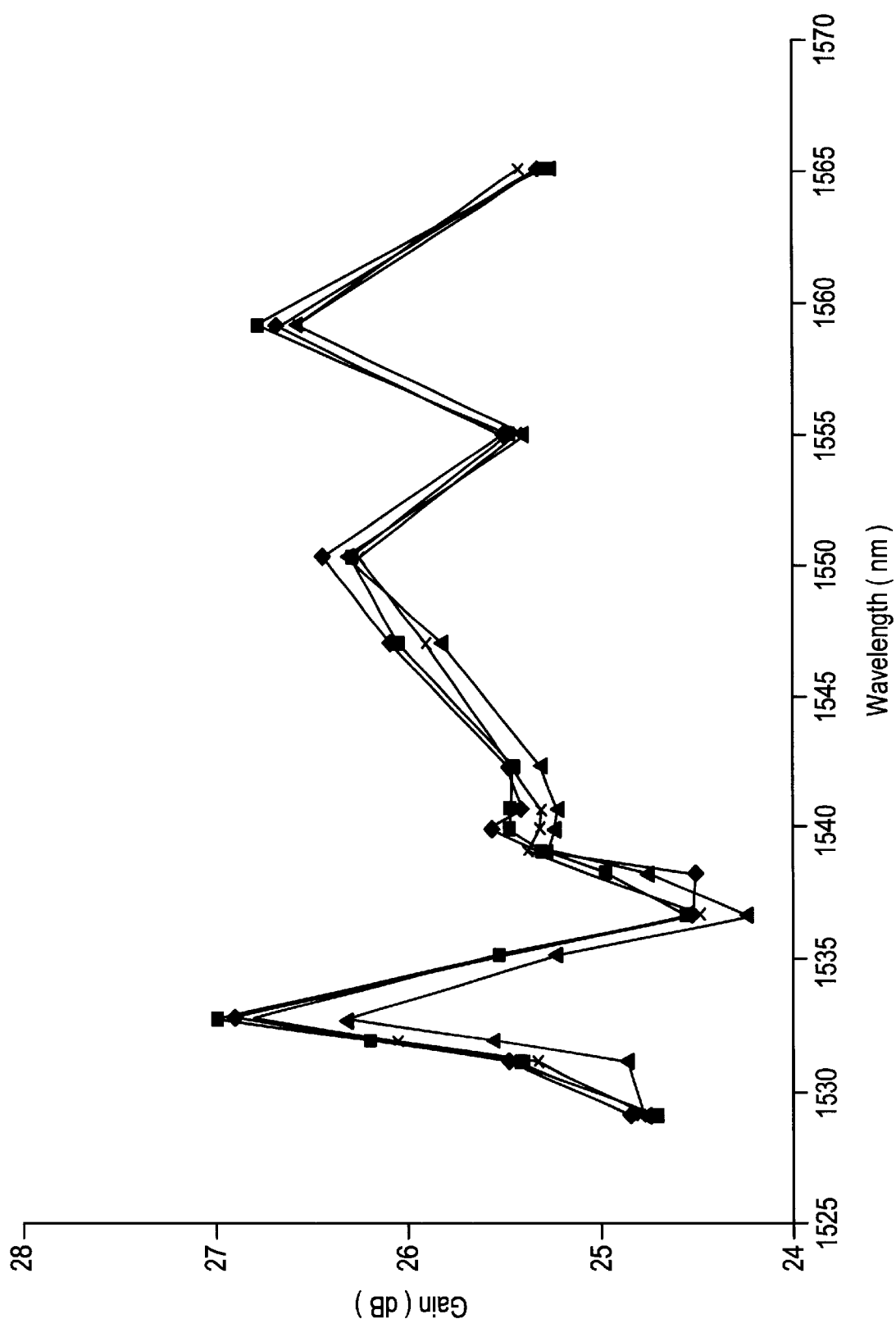
FIG. 9 illustrates the effects of a change in temperature on the shape of the gain spectrum of an erbium-doped fiber having an intermediate average inversion, i.e., coil 20c in FIG. 2. As in FIGS. 4 and 7, the diamond, square, triangular, and "x" data points are for fiber temperatures of 25° C., 35° C., 50° C., and 75° C., respectively, and the gain was fixed at 1538.982 nm for these four temperatures. In this case, the gain decreases by 0.2 dB at 1550 nm over the test range.
Figure 10:
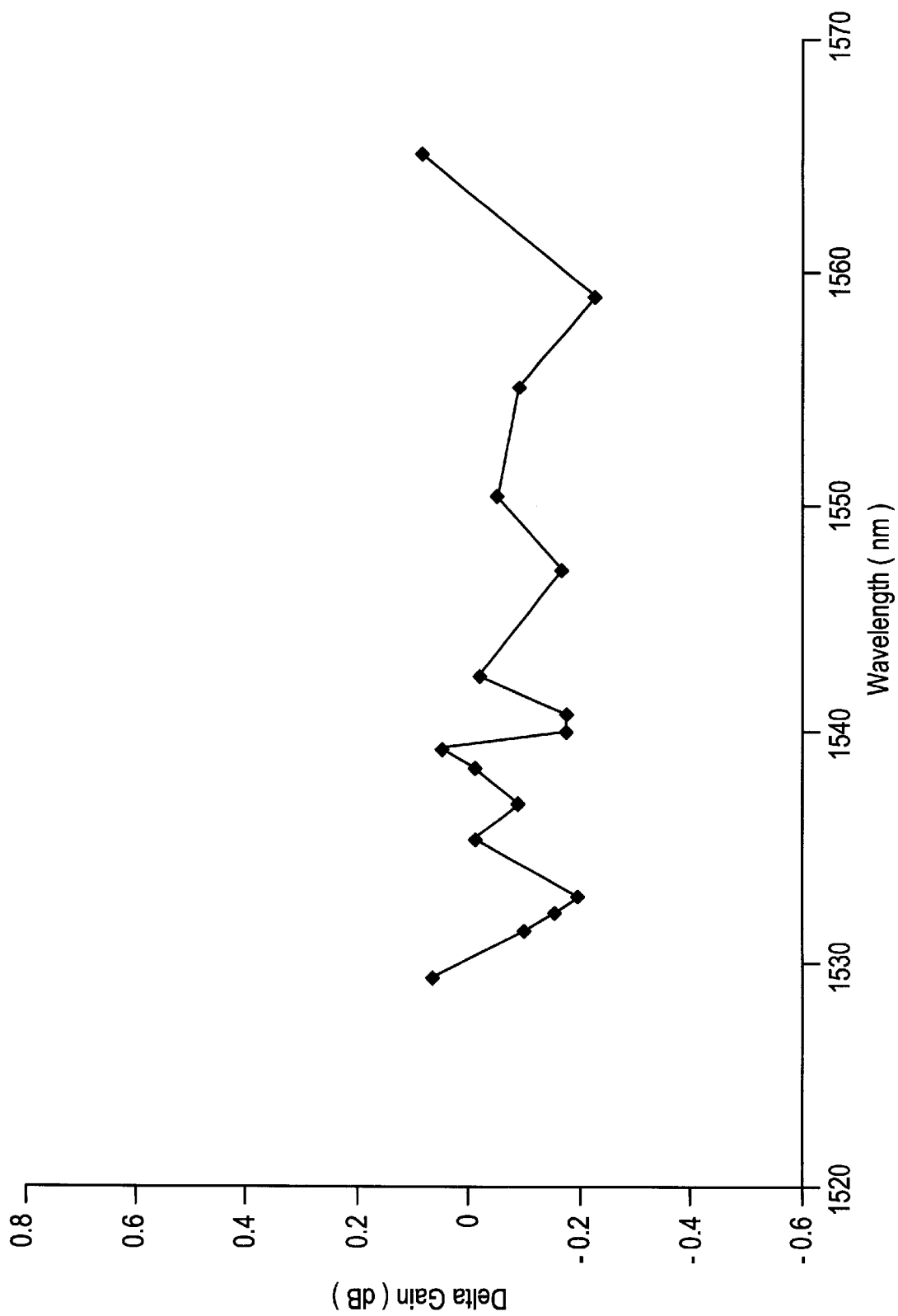
FIG. 10 plots delta gain (i.e., G(75° C.)–G(35° C.)) for the data of FIG. 9. As shown in this figure, the gain spectrum for this fiber exhibits substantially no tilt with a change of temperature, i.e., the gain spectrum is substantially athermal with respect to tilt.

The results for coil 20c with a fixed gain at 1538.982 nm are shown in FIGS. 9 and 10. As can be seen in these figures, this coil, which has an intermediate average inversion, is substantially athermal. Similar results to those shown in FIGS. 9 and 10 are obtained when the gain is not fixed at 1538.982 nm.

Figure 11:
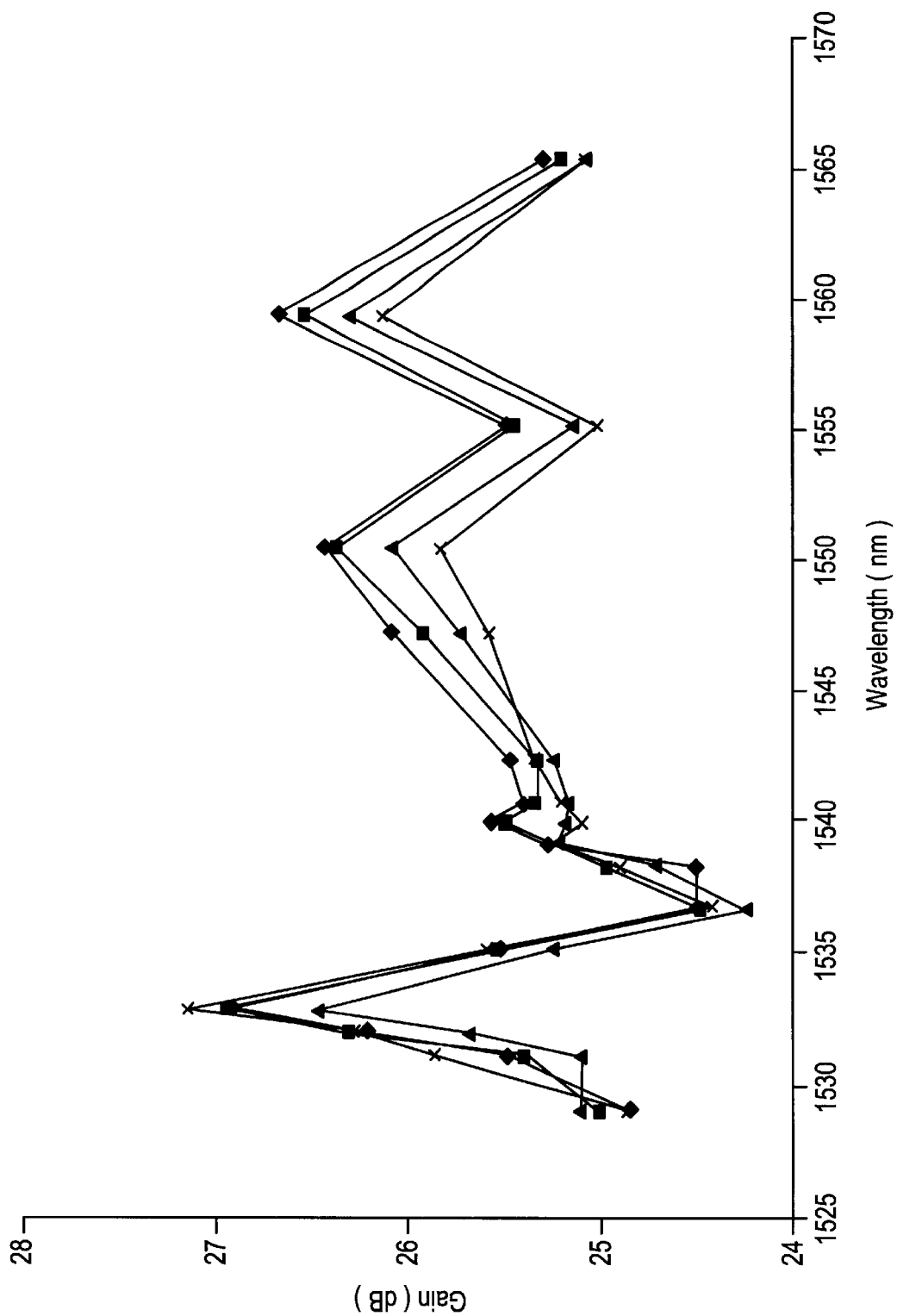
FIG. 11 illustrates the effects of a change in temperature on the shape of the gain spectrum of coil 20d in FIG. 2. The diamond, square, triangular, and "x" data points are for fiber temperatures of 25° C., 35° C., 50° C., and 75° C., respectively. The gain was fixed at 1538.982 nm for the four temperatures and the gain decreased by 1.0 dB at 1550 nm.
Figure 12:
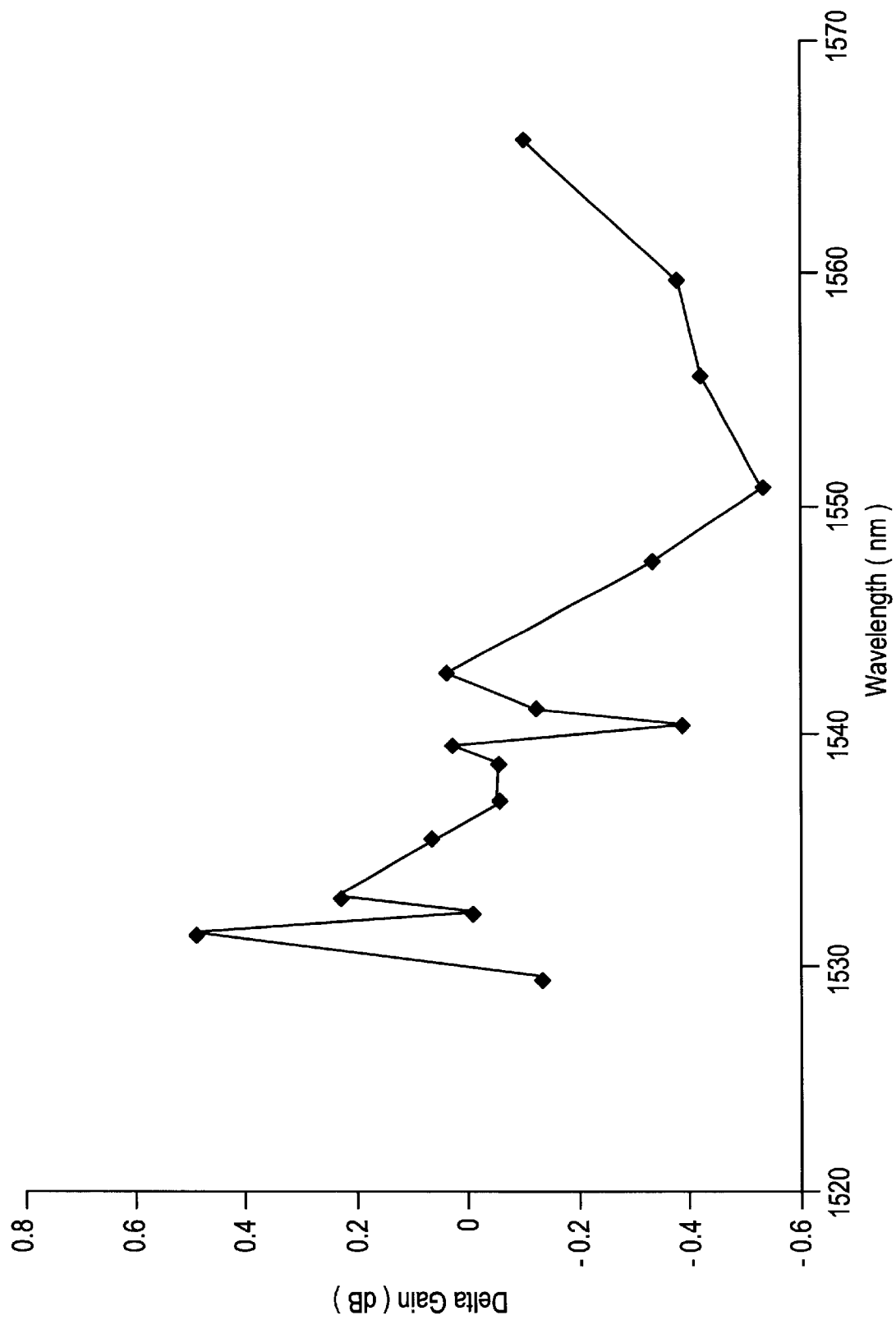

FIGS. 11 and 12 show the results obtained for coil 20d with a fixed gain at 1538.982 nm. This coil has a low average inversion and thus its behavior is similar to that of coil 20b. Again, similar results are obtained if the gain is not fixed at 1538.982 nm.

Figure 13:
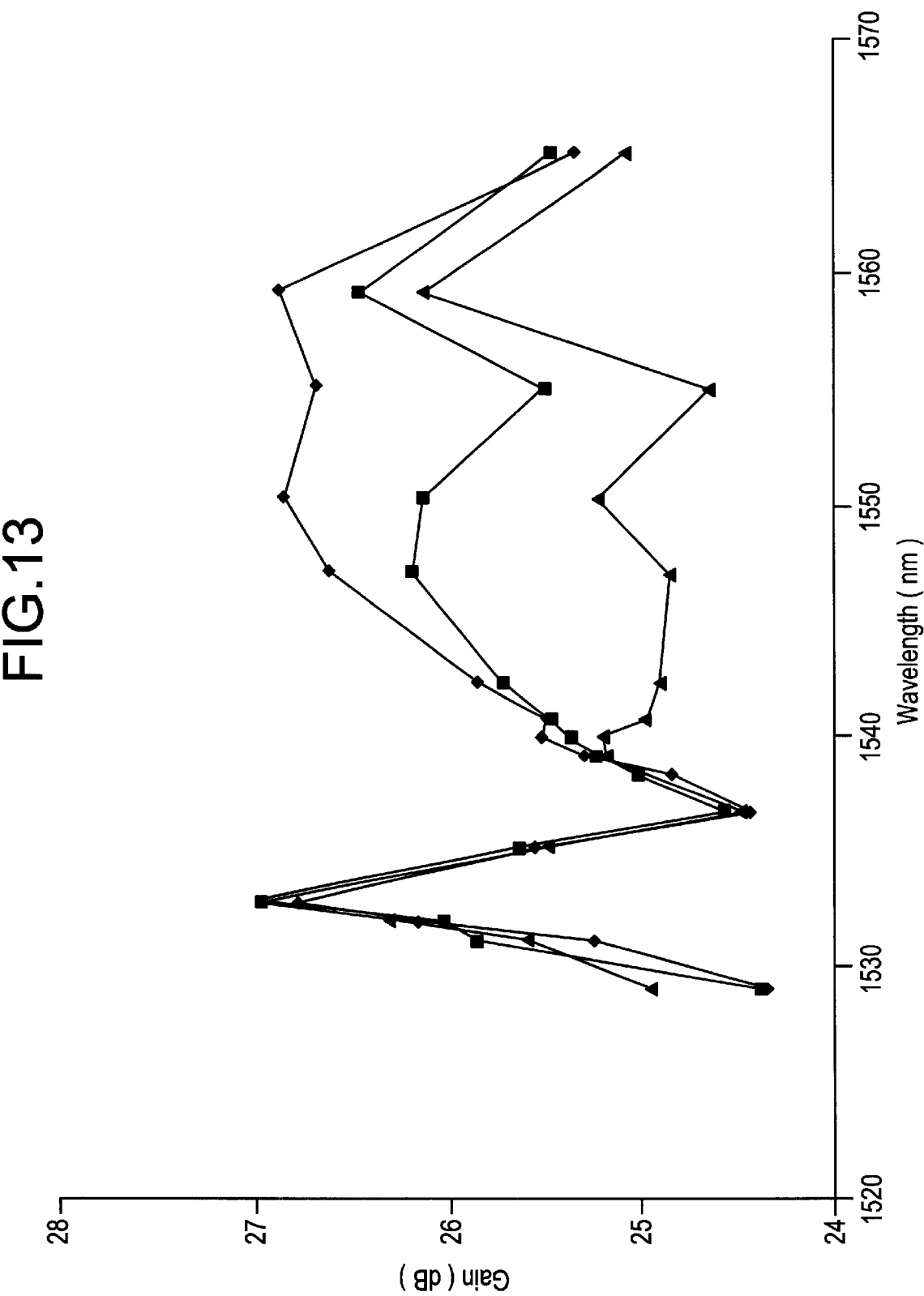
FIG. 13 shows the overall behavior of the gain spectrum of the multi-stage amplifier of FIG. 2 when the four coils making up this amplifier were heated from 5° C. to 75° C. The diamond, square, and triangular data points are for fiber temperatures of 5° C., 25° C., and 75° C., respectively. The gain was fixed at 1538.982 nm for the three temperatures. The gain decrease at 1550 nm over the test range was 2 dB.
Figure 14:
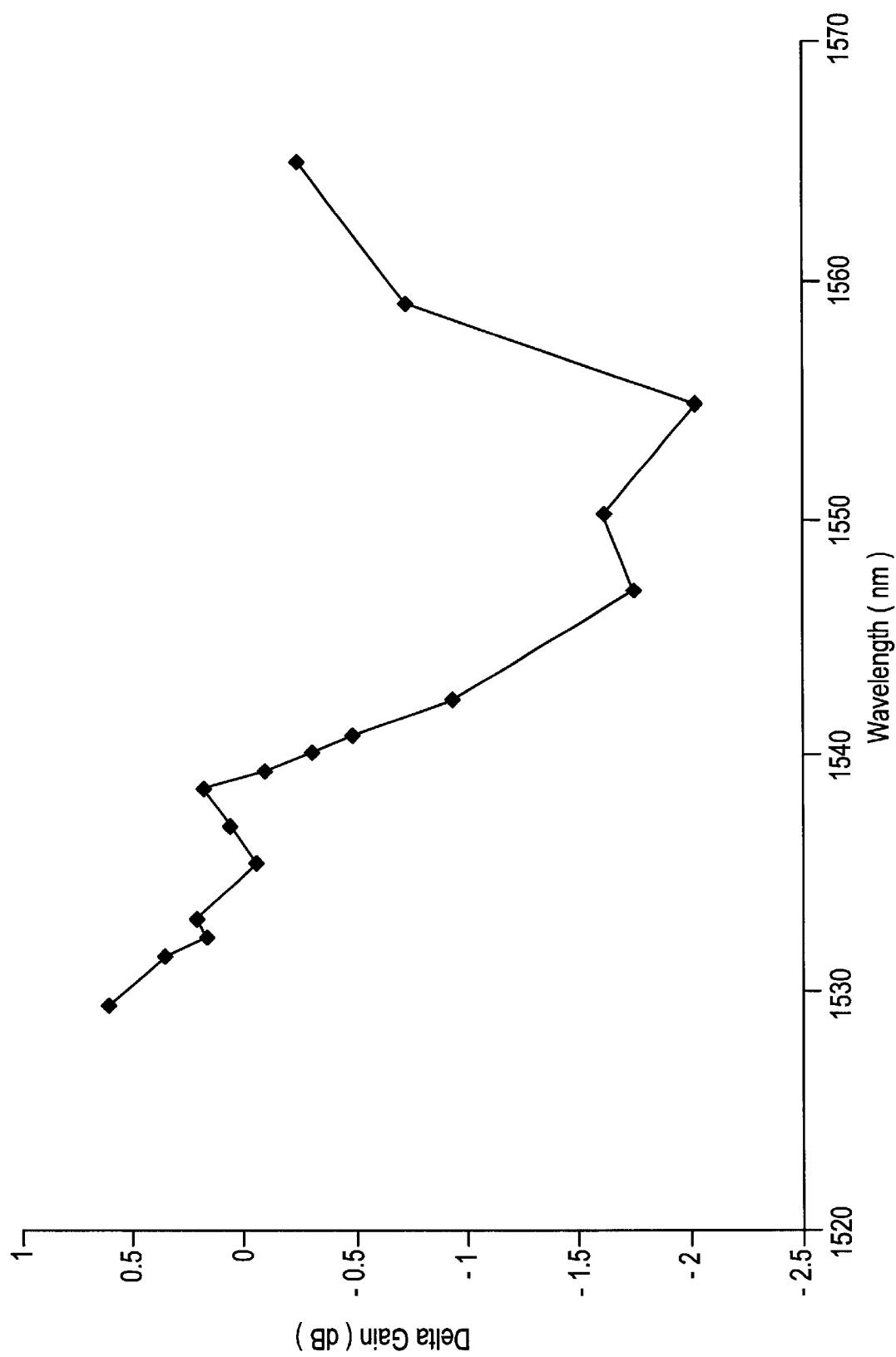
FIG. 14 plots delta gain (i.e., G(75° C.)–G(5° C.)) for the data of FIG. 13.

FIG. 13 illustrates the change in the gain spectrum resulting from heating all four coils of the amplifier of FIG. 2 from 5° C. (diamond data points) to 25° C. (square data points) and then to 75° C. (triangular data points). The gain was again held constant at 1538.982 nm for all three temperatures. FIG. 14 replots this data in terms of the difference between the gain at 75° C. and the gain at 5° C.

As shown in these figures, at a signal wavelength of 1550 nm, the gain spectrum changes by 1.8 dB as the temperature is changed from 5° C. to 75° C. These effects are important in the operation of an optical amplifier in view of the fact that in practice amplifiers have to be able to tolerate temperature variations ranging from 0° C. to 75° C.

Figure 15:
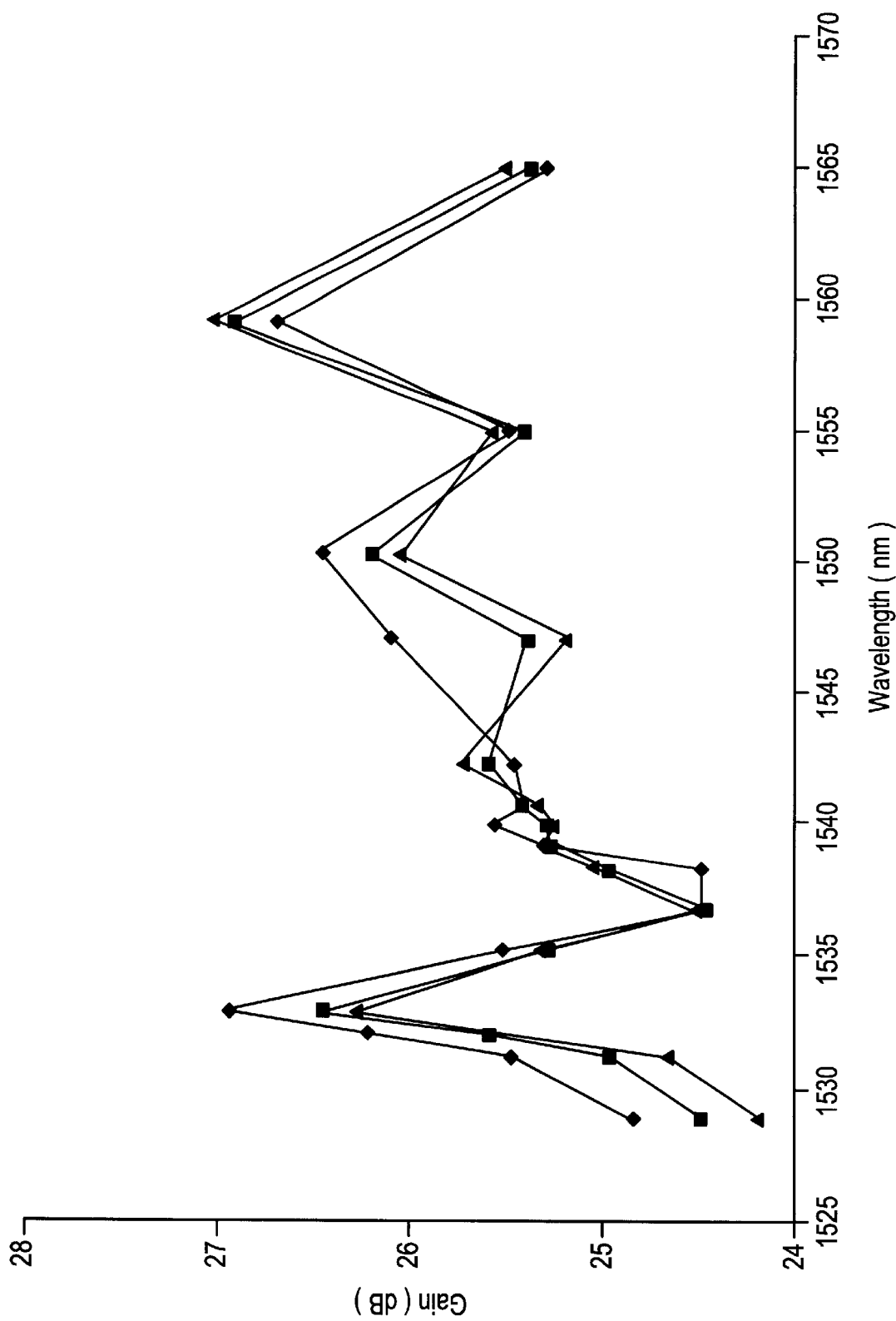
FIG. 15 shows the effects of holding the temperature of coils 20b and 20d at room temperature while increasing the temperature of coils 20a and 20c from 25° C. to 75° C. The diamond, square, and triangular data points are for fiber temperatures of 25° C., 50° C., and 75° C., respectively. The gain was fixed at 1538.982 nm for the three temperatures. By controlling the temperature of coils 20b and 20d, the gain change at 1550 nm over the test range was reduced to 0.2 dB.

The data of FIGS. 7–8 and 11–12 indicate that coils 20b and 20d are most susceptible to temperature variations. FIG. 15 shows the effects of holding the temperature of these coils constant at room temperature while heating coils 20a and 20c from 25° C. to 75° C. At a wavelength of 1550 nm, the change in gain is now 0.3 dB. This should be compared with the 1.0 dB change at 1550 nm which occurred when all four coils were heated over this range (see FIG. 13).

It should be noted that this approach of controlling the temperature of only those coils which are particularly temperature sensitive can be readily transferred to single stage amplifiers. In this case, temperature control is applied to the portions of the amplifying medium which are temperature sensitive, e.g., those having a low average inversion, while the temperature of those portions which are relatively temperature insensitive, e.g., those having an intermediate to high average inversion, is left uncontrolled.

Figure 16:
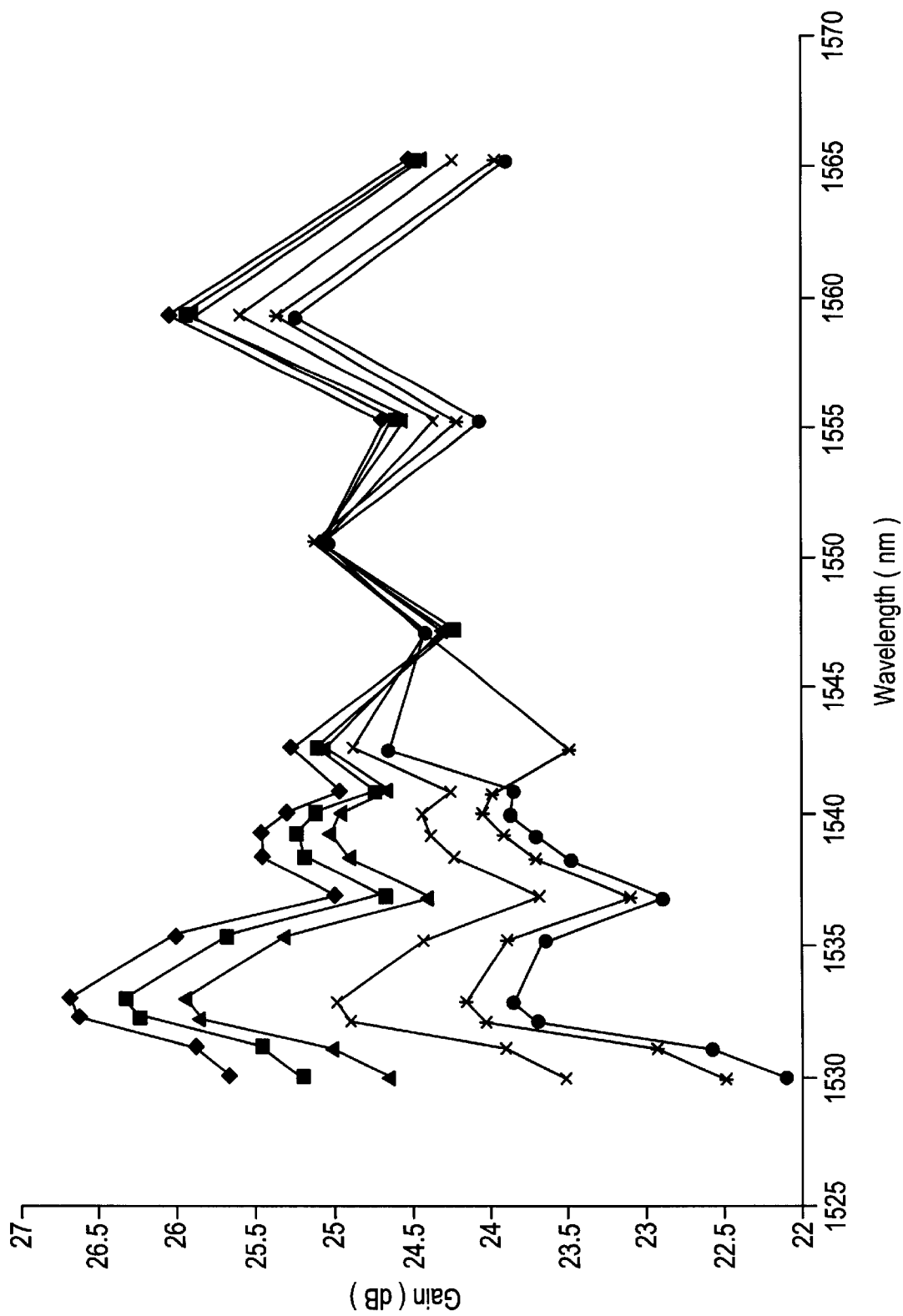
FIG. 16 shows the overall behavior of the gain spectrum of the multi-stage amplifier of FIG. 2 when the four coils making up this amplifier were heated from 0° C. to 75° C. The diamond, square, triangular, "x", "*", and circle data points are for fiber temperatures of 75° C., 65° C., 50° C., 25° C., 5° C. and 0° C., respectively. The gain was fixed at 1550 nm, instead of 1538.982 nm, for these temperatures.
Figure 17:
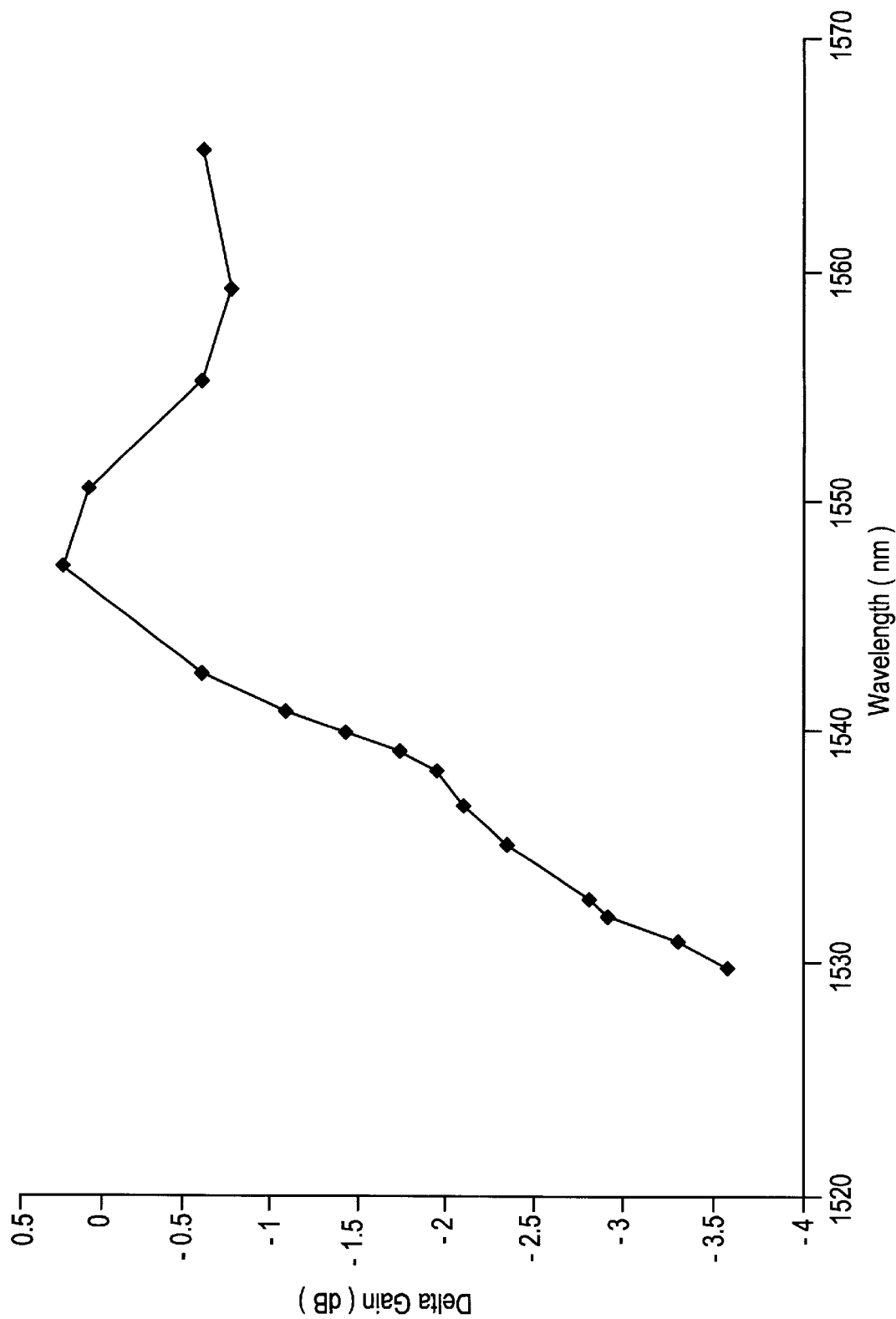
FIG. 17 plots delta gain (i.e., G(75° C.)–G(0° C.)) for the data of FIG. 16.

FIGS. 16 and 17 show the effects of heating the four coils of the multi-stage amplifier of FIG. 2 from 0° C. to 75° C. when the gain was fixed at 1550 nm rather than at 1538.982 nm. The large effects of the temperature change in the blue band are evident in these figures. In particular, gain changes in excess of 3.5 dB are seen in the blue band over this temperature range. Similar large changes are seen in the individual coils, especially those which are particularly temperature sensitive because of their low average inversions, i.e., coils 20b and 20d.

Figure 18:
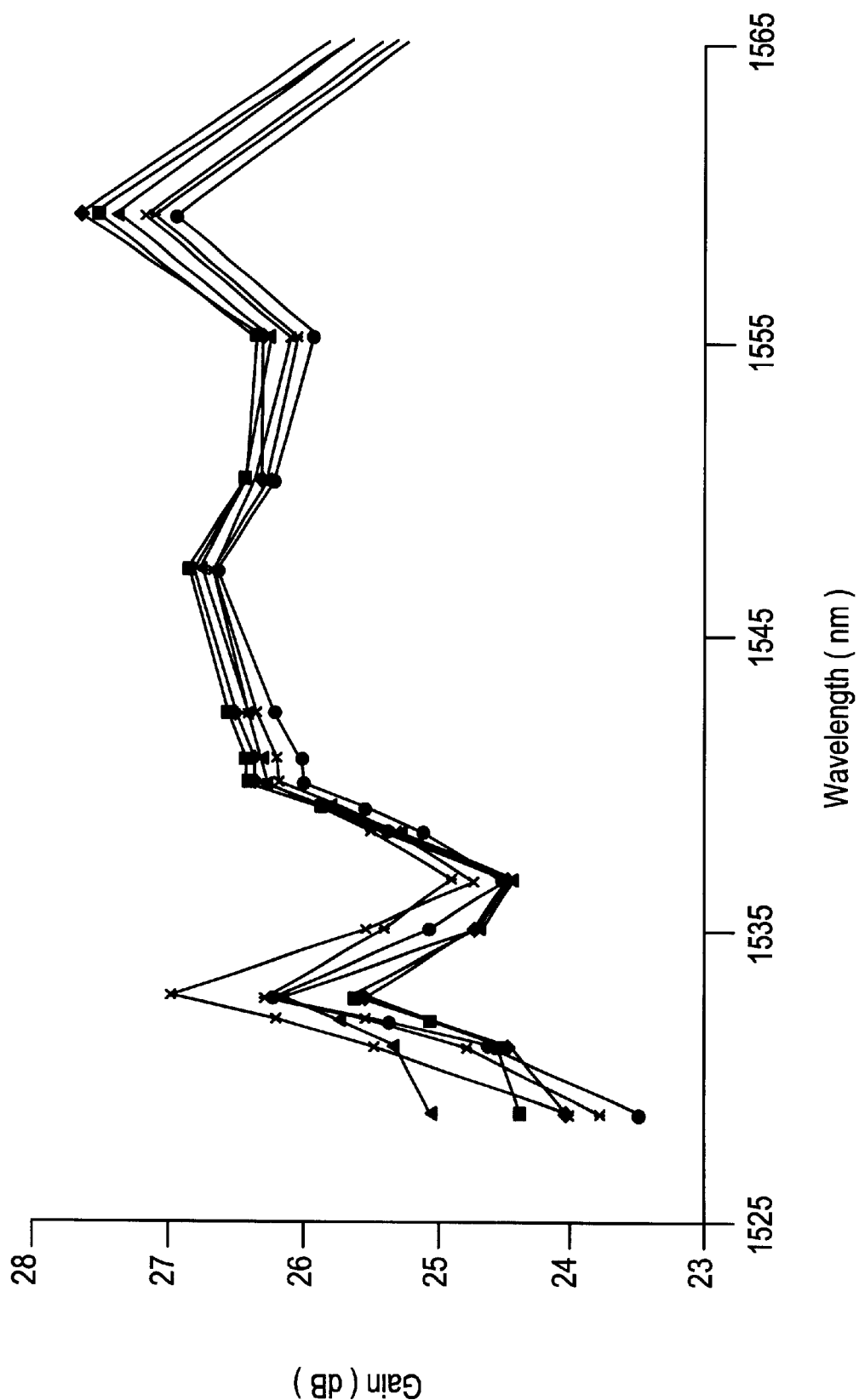
FIG. 18 shows the effect of pump wavelength on the gain spectrum of the multi-stage amplifier of FIG. 2. The diamond, square, triangular, "x", "*", and circle data points are for pump wavelengths of 974, 976, 978, 980, 982, and 985 nanometers, respectively, for pumps 21a, 21d, and 21e. The data for this figure was obtained with each of coils 20a through 20f at room temperature.

FIG. 18 shows the effects of varying the pump wavelength for pumps 21a, 21d, and 21e on the gain spectrum. It is clear from this figure that changing the pump wavelength from 974 nm to 985 nm leads to a tilt in the gain spectrum, and that the trend is to increase the gain at lower wavelengths and to decrease the gain at higher wavelengths. A change in the pump wavelength for pumps 21b, 21c, and 21f, which operate at a center pump wavelength of 1480 nm, was found not to significantly affect the shape of the gain spectrum.

Figure 19:
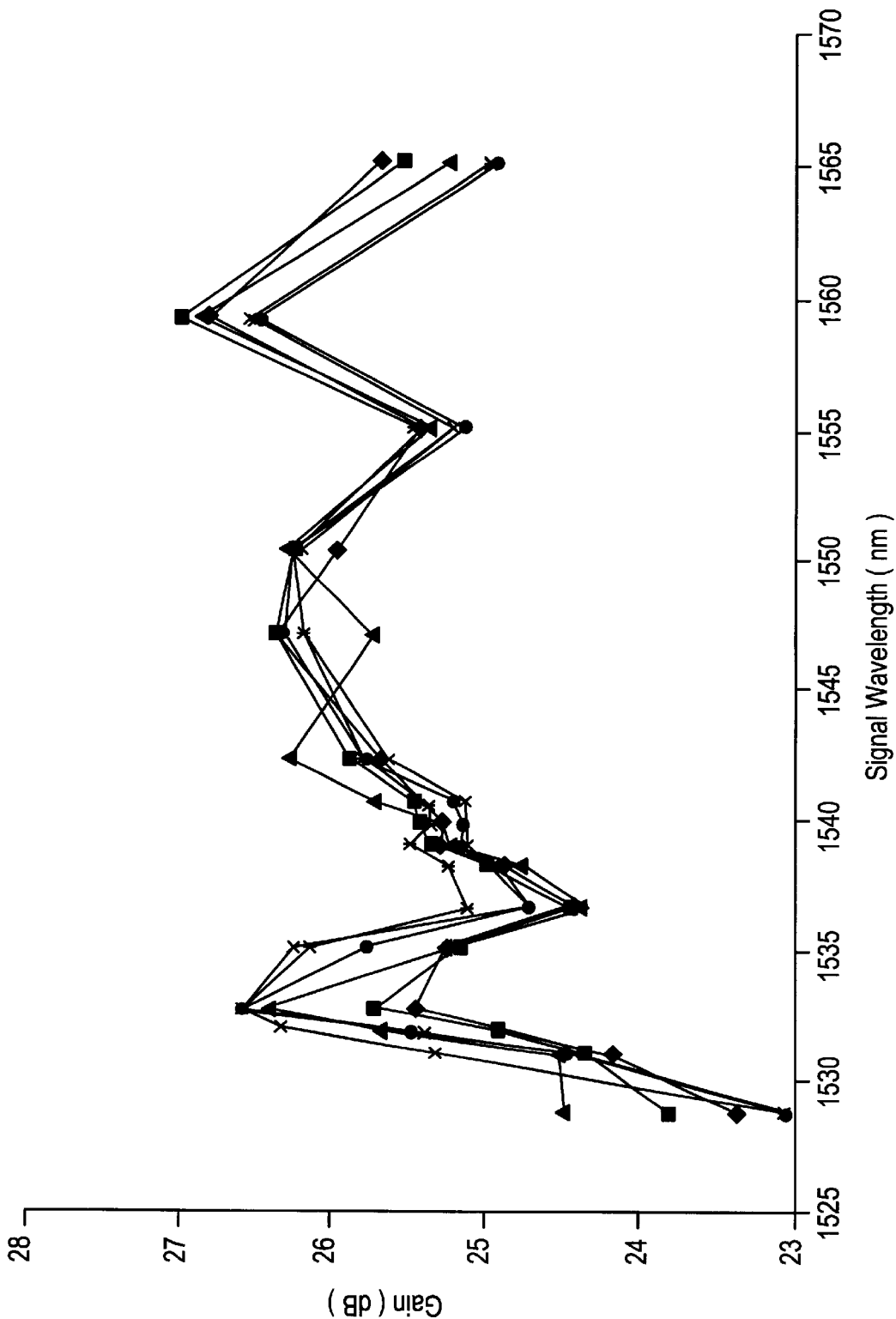
FIGS. 19 and 20 show the combined effects of temperature and pump wavelength on the gain spectrum. In particular.
Figure 20:
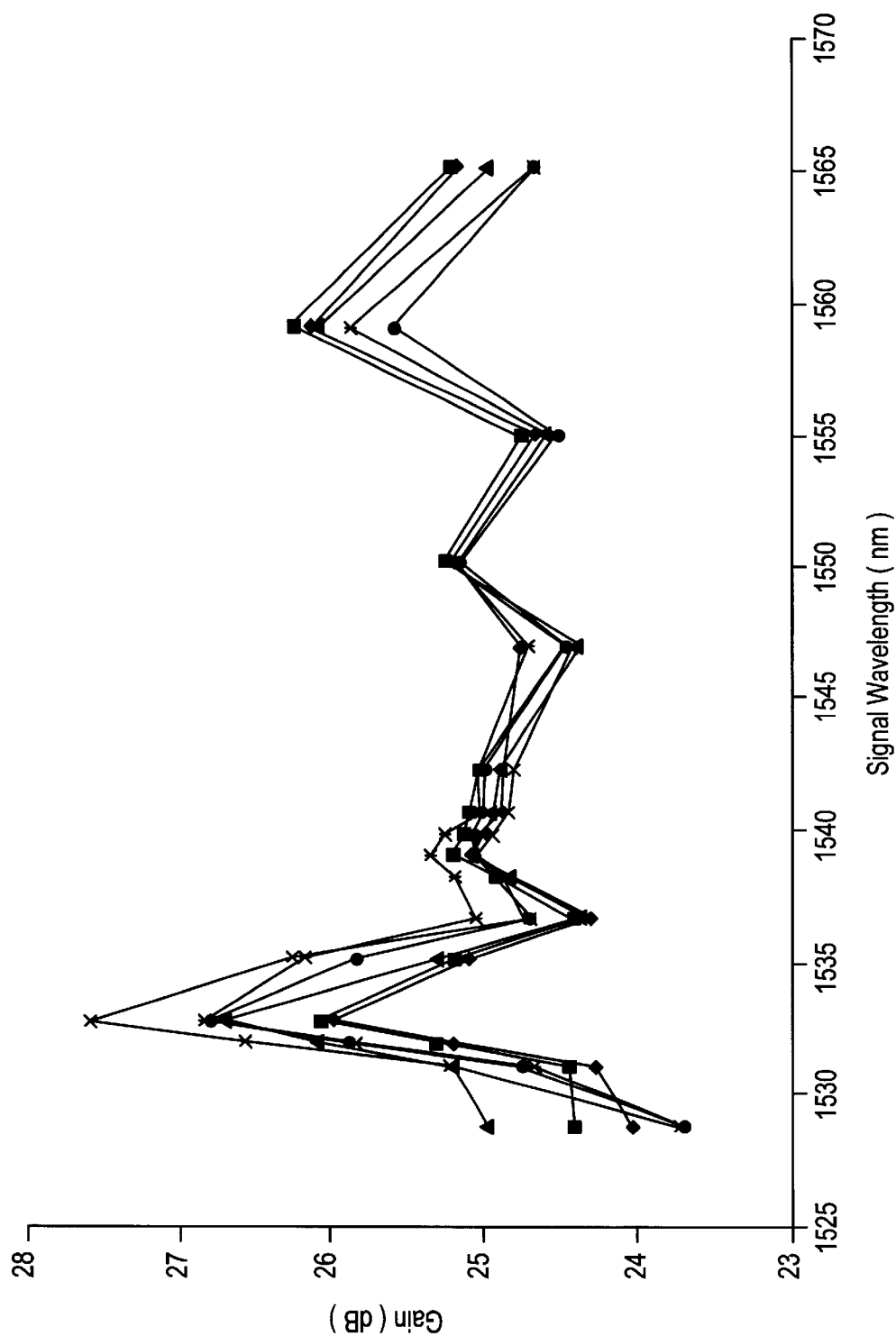

The combined effect of temperature and pump wavelength on the gain spectrum is shown in FIGS. 19–21. An examination of these figures reveals that the plot of FIG. 20 is a superposition of the plot of FIG. 19 and FIG. 13. This can even more clearly be seen by comparing FIGS. 14 and 21 which have generally similar shapes. These results show that temperature and pump wavelength act substantially independently on the shape of the gain spectrum.

In both FIGS. 19 and 20, an island of high gain exists at a signal wavelength of 1533 nm and at a pump wavelength of 980 nm and is independent of temperature (see FIG. 13). At a pump wavelength of 976 nm and at a temperature of 25° C., the gain flatness across the signal band is 3 dB. At 75° C., although the gain at 1532 nm remains constant, the effect is to increase the gain at 1529 nm by 0.5 dB and to reduce the gain at 1559 nm from 27 dB to 26.2 dB. The gain flatness across the spectrum at a pump wavelength of 976 nm is now reduced from 3 dB to 2.4 dB.

The foregoing experiments demonstrate the importance of both temperature and pump wavelength on the erbium gain spectrum. In the case of temperature, the tilt in the gain spectrum is dependent on the inversion of the amplifier or, more particularly, the inversion of the coil or coils being preferentially heated. In the case of pump wavelength, increasing the wavelength tends to tilt an amplifier's spectrum up in the blue band and down in the red band. The combined effect of temperature and pump wavelength is a superposition of the two effects, thus making these effects especially efficacious in optimizing the performance of an optical amplifier.

EXAMPLE 2

Single Stage Amplifier

This example uses a single stage amplifier rather than a multi-stage amplifier thus allowing numerical values for average inversion to be determined. The amplifier had a structure of the type shown in FIG. 1 and used components of the same types as used in Example 1. The length of the erbium-doped fiber was 11 meters in this case. The amplifier had an output power of 3 dBm in all cases and was run at different levels of pump power (980 nm) to change its level of inversion.

In particular, the amplifier was operated at high, intermediate, and low average inversions, where the average inversion $n_2$ was determined by measuring the amplifier's gain spectrum $G(\lambda)$ for each inversion level and then performing a least squares fit of the following equation to that spectrum to determine $n_2$:

$$G(\lambda)=L \cdot [(g^*(\lambda)+\alpha(\lambda)) \cdot n_2 - \alpha(\lambda)] - A$$

where L is the fiber's length, $g^*(\lambda)$ is the fiber's measured emission coefficient in dB/m (i.e., its gain coefficient at full inversion), $\alpha(\lambda)$ is its measured absorption coefficient in dB/m (i.e., its loss coefficient at zero inversion), and A is total loss of the passive (i.e., non-gain-fiber) components between the amplifier's input and output.

Figure 22A:
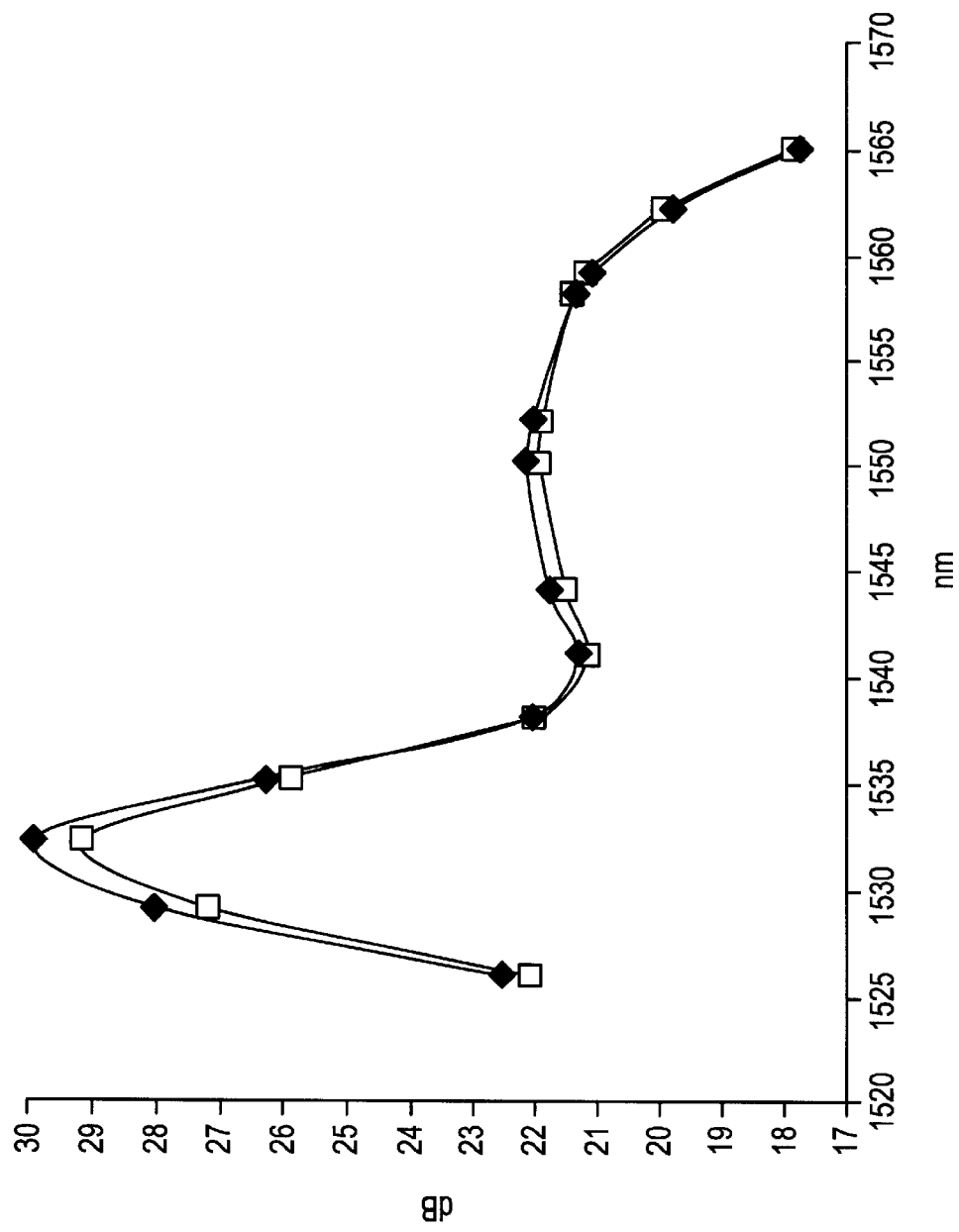
FIGS. 22A, 22B, and 22C illustrate the effects of a change in temperature on the shape of the gain spectrum of an erbium-doped fiber having a high average inversion (0.77), an intermediate average inversion (0.72), and a low average inversion (0.58), respectively. The square data points for FIGS. 22A and 22C were for a fiber temperature of 70° C., while the diamond data points were for a temperature of 25° C. For FIG. 22B, the data points were for the opposite temperatures. In each case, the output power of the fiber was 3 dBm.
Figure 22B:
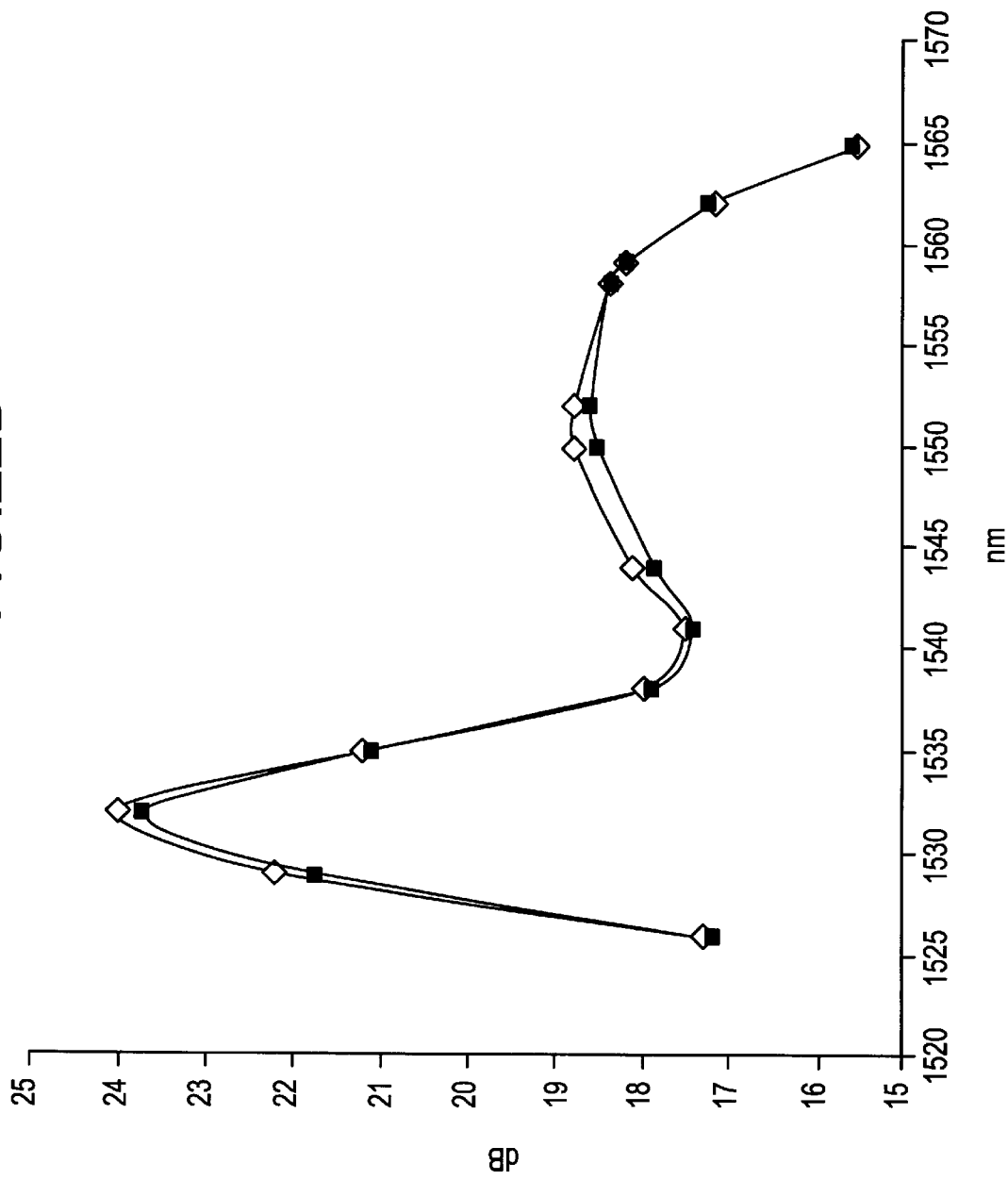
Figure 22C:
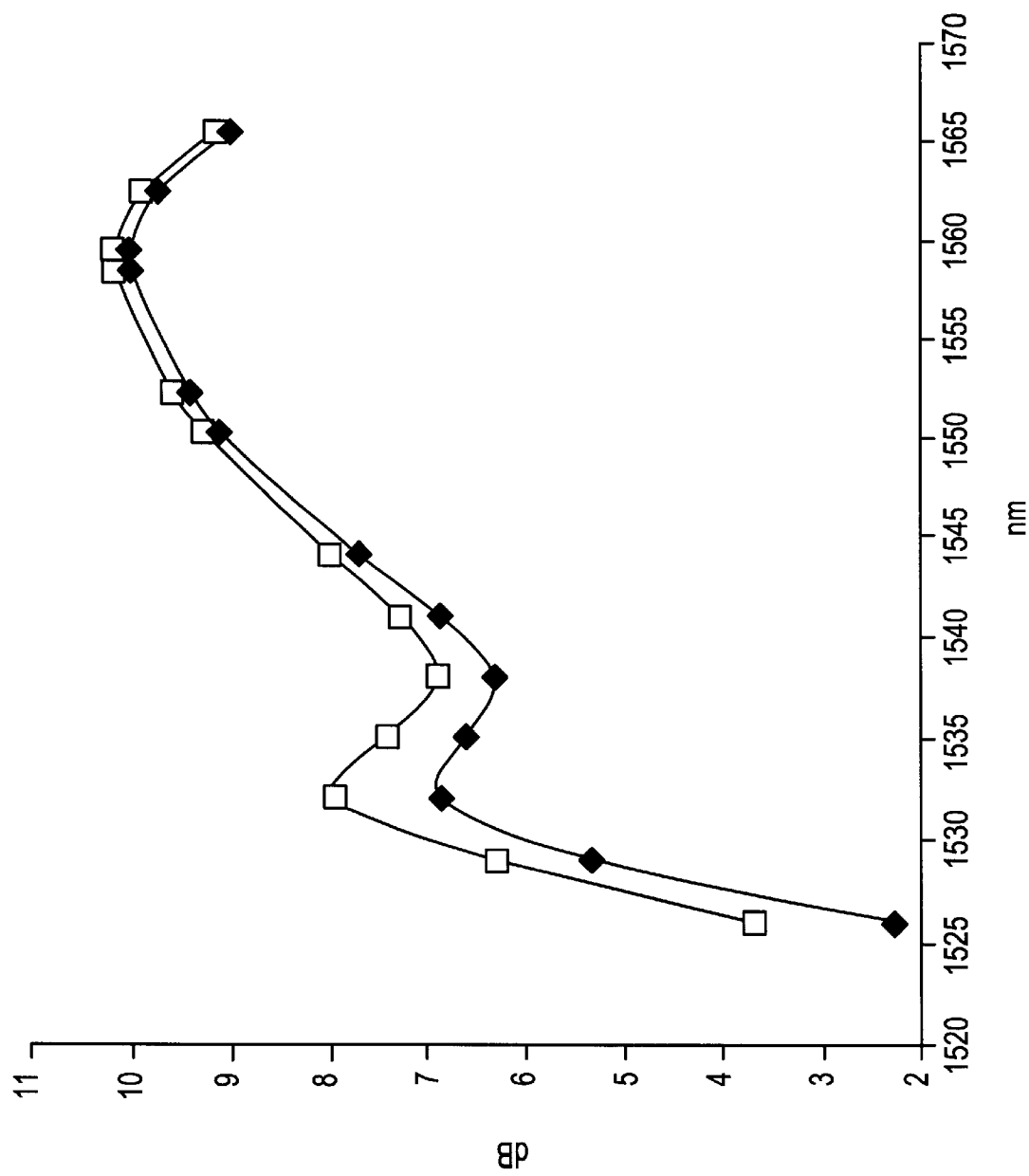
Figure 23:
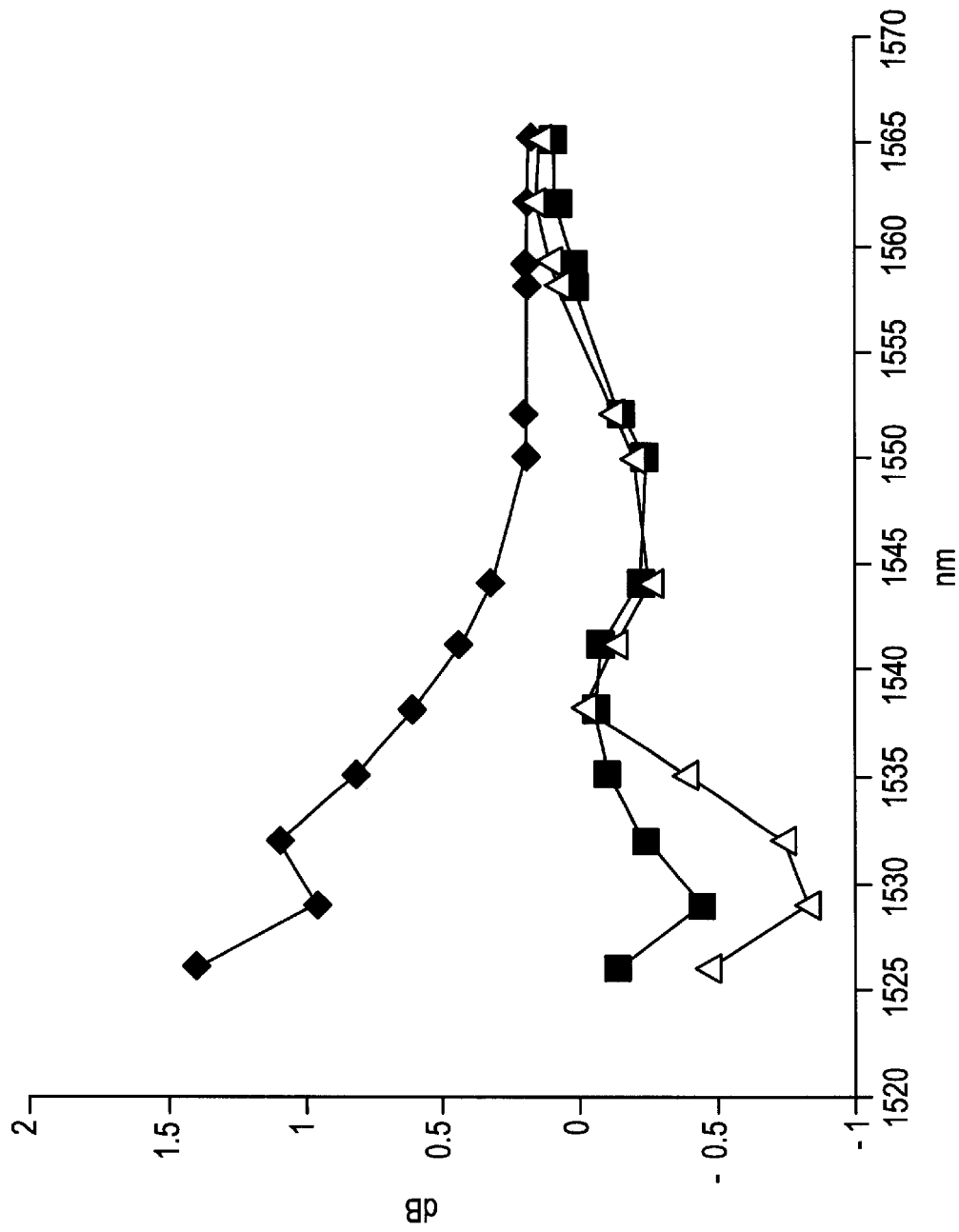
FIG. 23 plots delta gain (i.e., G(70° C.)–G(25° C.)) for the data of FIG. 22A (triangular data points), FIG. 22B (square data points), and FIG. 22C (diamond data points).

The numerical values for average inversion obtained in this way were 0.77 (high inversion), 0.72 (intermediate inversion), and 0.58 (low inversion). The temperature behavior for these inversion levels is shown in FIGS. 22A, 22B, and 22C, respectively, and is summarized in FIG. 23.

As shown therein, when the fiber had a low average inversion (diamond data points in FIG. 23), it was highly temperature sensitive and exhibited a clockwise tilt with an increase in temperature, when it had a high average inversion (triangular data points in FIG. 23), it was less temperature sensitive and exhibited a counterclockwise tilt with an increase in temperature, and when it had an intermediate average inversion (square data points in FIG. 23), it was substantially athermal.

The data of these figures demonstrate that average inversion is the primary variable in the thermal tuning of optical amplifiers, as opposed to fiber length or input power which are secondary variables, their effects being a result of their impact on average inversion.

Although specific embodiments of the invention have been described and illustrated, it is to be understood that modifications can be made without departing from the invention's spirit and scope. For example, the signal band of an N-channel amplifier can be divided into sub-bands and a separate amplifier can be used for each sub-band. Thermal tuning and/or separate amplifier can be used for each sub-band. Thermal tuning and/or pump wavelength tuning can then be applied to each of these separate amplifiers.

As another variation, rather than controlling the temperature of the amplifying medium, that temperature can be allowed to vary with pump wavelength being used to compensate for changes in the shape of the amplifier's gain spectrum as a result of such temperature changes based on the amplifying medium's level of inversion. The adjustment in pump wavelength can be performed in the field either manually or automatically. Alternatively, a compromise pump wavelength can be chosen which, although not optimum for all or any of the temperatures which the amplifying medium may experience, provides adequate performance for those temperatures without the need for in-the-field adjustment.

The above referenced Pump Wavelength Tuning Application discusses a variety of applications of pump wavelength tuning in optical communication systems including applications relating to, among other things, cascaded amplifiers, WDM systems, dynamic control protocols, and the selection of amplifier components such as filters and pumps, including selection based on the in-use (aging) behavior of such components. The thermal tuning techniques of the present invention can similarly be used for these purposes, either instead of or in combination with pump wavelength tuning.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

TABLE 1

| Component | Characteristics |
| --- | --- |
| Fiber 12 | Standard single mode fiber signal input |
| Coil 20a | 10 m erbium-doped fiber |
| Coil 20b | 16.5 m erbium-doped fiber |
| Coil 20c | 9.5 m erbium-doped fiber |

TABLE 1-continued

| Component | Characteristics |
|---|---|
| Coil 20d | 6 m erbium-doped fiber |
| Pump 21a | 980 nm pump with thermoelectric temperature control |
| Pump 21b | 1480 nm pump with thermoelectric temperature control |
| Pump 21c | 1480 nm pump with thermoelectric temperature control |
| Pump 21d | 980 nm pump with thermoelectric temperature control |
| Pump 21e | 980 nm pump with thermoelectric temperature control |
| Pump 21f | 1480 nm pump with thermoelectric temperature control |
| Coupler 22a | 980/1550 nm WDM |
| Coupler 22b | 980/1550 nm WDM |
| Coupler 22c | 1480/1550 nm WDM |
| Coupler 22d | 980/1550 nm WDM |
| Coupler 22e | 1480/1550 nm WDM |
| Coupler 22f | 980/1550 nm WDM |
| Coupler 22g | 980/1550 nm WDM |
| Coupler 22h | 1480/1550 nm WDM |
| Filter 65 | Broad band dielectric gain flattening filter |
| VOA 67 | Variable optical attenuator |

What is claimed is:

1. A method of operating an optical amplifier, said optical amplifier having a gain spectrum and comprising an optical amplifying medium which can have at least a first and a second level of inversion, said method comprising controlling the temperature of at least a portion of the optical amplifying medium based on the level of inversion of said portion to control the shape of the gain spectrum of the optical amplifier, wherein
   (a) the gain spectrum extends from shorter wavelengths to longer wavelengths;
   (b) the first level of inversion is higher than the second level of inversion; and
   (c) increasing the temperature of said portion for the first level of inversion results in an increase in gain for longer wavelengths relative to shorter wavelengths and increasing the temperature of said portion for the second level of inversion results in an increase in gain for shorter wavelengths relative to longer wavelengths.

2. The method of claim 1 wherein the shorter wavelengths are in the range from about 1529 nm to about 1545 nm and the longer wavelengths are in the range from about 1545 nm to about 1565 nm.

3. A method of operating an optical amplifier, said optical amplifier having a gain spectrum and comprising an optical amplifying medium, said gain spectrum being subject to variations as a result of changes in at least one operating condition of the amplifier, said method comprising inputting a plurality of signals at different wavelengths to the amplifier and adjusting the temperature of at least a portion of the optical amplifying medium based on the level of inversion of said portion to compensate for variations in the gain spectrum as a result of a change in said at least one operating condition wherein each of said plurality of signals has an input power and the change in said at least one operating condition comprises a change in at least one of said input powers.

4. A method of operating an optical amplifier, said optical amplifier having a gain spectrum and comprising an optical amplifying medium, said gain spectrum being subject to variations as a result of changes in at least one operating condition of the amplifier, said method comprising inputting a plurality of signals at different wavelengths to the amplifier and adjusting the temperature of at least a portion of the optical amplifying medium based on the level of inversion of said portion to compensate for variations in the gain spectrum as a result of a change in said at least one operating condition, wherein the change in said at least one operating condition comprises a change in the wavelength of at least one of the signals.

5. A method of operating an optical amplifier, said optical amplifier having a gain spectrum and comprising an optical amplifying medium, said gain spectrum being subject to variations as a result of changes in at least one operating condition of the amplifier, said method comprising inputting a plurality of signals at different wavelengths to the amplifier and adjusting the temperature of at least a portion of the optical amplifying medium based on the level of inversion of said portion to compensate for variations in the gain spectrum as a result of a change in said at least one operating condition wherein the optical amplifying medium is pumped with light having a pump wavelength and the change in operating condition comprises a change in the pump wavelength.

6. A method of operating an optical amplifier, said optical amplifier having a gain spectrum and comprising an optical amplifying medium, said gain spectrum being subject to variations as a result of changes in at least one operating condition of the amplifier, said method comprising inputting a plurality of signals at different wavelengths to the amplifier and adjusting the temperature of at least a portion of the optical amplifying medium based on the level of inversion of said portion to compensate for variations in the gain spectrum as a result of a change in said at least one operating condition, wherein the optical amplifying medium is pumped with light having a pump power and the change in operating condition comprises a change in the magnitude of the pump power.

7. A method for controlling the gain spectrum of an optical amplifier, said optical amplifier comprising:
   (a) an optical amplifying medium; and
   (b) a pump which supplies pump power to the medium in a pump band, said pump power having a spectrum which has a center wavelength;
said method comprising adjusting both the temperature of at least a portion of the optical amplifying medium and the value of the center wavelength within the pump band to control the shape of the gain spectrum of the optical amplifier.

8. The method of claim 7 wherein adjusting the temperature of said portion and adjusting the value of the center wavelength have substantially independent effects on the shape of the gain spectrum.

9. The method of claim 7 wherein:
   (a) the optical amplifying medium can have at least a first and a second level of inversion, with the first level of inversion being higher than the second level of inversion;
   (b) the gain spectrum extends from shorter wavelengths to longer wavelengths; and
   (c) increasing the temperature of said portion for the first level of inversion results in an increase in gain for longer wavelengths relative to shorter wavelengths and increasing the temperature of said portion for the second level of inversion results in an increase in gain for shorter wavelengths relative to longer wavelengths.

10. The method of claim 9 wherein the shorter wavelengths are in the range from about 1529 nm to about 1545 nm and the longer wavelengths are in the range from about 1545 nm to about 1565 nm.

11. A method of operating a multistage optical amplifier, said multistage optical amplifier having a gain spectrum and comprising a concatenation of at least two individually pumped optical amplifying media, said method comprising controlling the temperature of at least a portion of at least one of said individually pumped optical amplifying media based on the level of inversion of said individually pumped media to control the shape of said gain spectrum of the multistage optical amplifier.

12. The method of claim 11 wherein:
(a) each optical amplifying medium can have at least a first and a second level of inversion, with the first level of inversion being higher than the second level of inversion;
(b) the gain spectrum of the multistage optical amplifier extends from shorter wavelengths to longer wavelengths; and
(c) increasing the temperature of said portion for the first level of inversion results in an increase in gain for longer wavelengths relative to shorter wavelengths and increasing the temperature of said portion for the second level of inversion results in an increase in gain for shorter wavelengths relative to longer wavelengths.

13. The method of claim 12 wherein the shorter wavelengths are in the range from about 1529 nm to about 1545 nm and the longer wavelengths are in the range from about 1545 nm to about 1565 nm.

14. A method of operating an optical amplifier, said optical amplifier having a gain spectrum and comprising an optical amplifying medium which comprises a first portion and a second portion, the average inversion of the first portion being less than the average inversion of the second portion, said method comprising controlling the temperature of the first portion to control the shape of the gain spectrum of the optical amplifier and not controlling the temperature of the second portion.

15. A method of operating a multistage optical amplifier, said multistage optical amplifier having a gain spectrum and comprising a concatenation of a first individually pumped optical amplifying medium and a second individually pumped optical amplifying medium, the average inversion of the first medium being less than the average inversion of the second medium, said method comprising controlling the temperature of the first medium or a portion thereof to control the shape of said gain spectrum of the multistage optical amplifier and not controlling the temperature of the second medium.

16. An optical amplifier having a gain spectrum and comprising: an optical amplifying medium which can exhibit at least a first and a second level of inversion; and means for controlling the shape of the gain spectrum by adjusting the temperature of at least a portion of the optical amplifying medium based on the level of inversion of said portion.

17. The optical amplifier of claim 16 wherein:
(a) the gain spectrum extends from shorter wavelengths to longer wavelengths;
(b) the first level of inversion is higher than the second level of inversion; and
(c) increasing the temperature of said portion for the first level of inversion results in an increase in gain for longer wavelengths relative to shorter wavelengths and increasing the temperature of said portion for the second level of inversion results in an increase in gain for shorter wavelengths relative to longer wavelengths.

18. The optical amplifier of claim 17 wherein the shorter wavelengths are in the range from about 1529 nm to about 1545 nm and the longer wavelengths are in the range from about 1545 nm to about 1565 nm.

19. An optical amplifier having a gain spectrum which is subject to variations as a result of changes in at least one operating condition of the amplifier, said amplifier comprising: an optical amplifying medium; means for inputting a plurality of signals at different wavelengths to the amplifier; and means for adjusting the temperature of at least a portion of the optical amplifying medium based on level of inversion of said portion to compensate for variations in the gain spectrum as a result of a change in said at least one operating condition.

20. The optical amplifier of claim 19 wherein each of said plurality of signals has an input power and the change in said at least one operating condition comprises a change in at least one of said input powers.

21. The optical amplifier of claim 19 wherein the change in said at least one operating condition comprises a change in the wavelength of at least one of the signals.

22. The optical amplifier of claim 19 wherein:
(i) the amplifier comprises a pump which supplies light to the optical amplifying medium at a pump wavelength; and
(ii) the change in operating condition comprises a change in the pump wavelength.

23. The optical amplifier of claim 19 wherein:
(i) the amplifier comprises a pump which supplies light to the optical amplifying medium, said pump having a pump power; and
(ii) the change in operating condition comprises a change in the magnitude of the pump power.

24. An optical amplifier having a gain spectrum and comprising:
an optical amplifying medium; a pump which supplies pump power to the medium in a pump band, said pump power having a spectrum which has a center wavelength; and means for (i) controlling the value of the center wavelength within the pump band and (ii) adjusting the temperature of at least a portion of the optical amplifying medium to control the shape of the gain spectrum of the optical amplifier.

25. The optical amplifier of claim 19, or 24 wherein:
(a) the optical amplifying medium can have at least a first and a second level of inversion, with the first level of inversion being higher than the second level of inversion;
(b) the gain spectrum extends from shorter wavelengths to longer wavelengths; and
(c) increasing the temperature of said portion for the first level of inversion results in an increase in gain for longer wavelengths relative to shorter wavelengths and increasing the temperature of said portion for the second level of inversion results in an increase in gain for shorter wavelengths relative to longer wavelengths.

26. The optical amplifier of claim 25 wherein the shorter wavelengths are in the range from about 1529 nm to about 1545 nm and the longer wavelengths are in the range from about 1545 nm to about 1565 nm.

27. An optical amplifier having a gain spectrum and comprising:
an optical amplifying medium; a pump which supplies pump power to the medium in a pump band, said pump power having a spectrum which has a center wavelength; and means for controlling the value of the center wavelength within the pump band to compensate for variations in the gain spectrum as a result of a change in the temperature of the optical amplifying medium or a portion thereof.

28. A multistage optical amplifier which has a gain spectrum and comprises: (a) a concatenation of at least two individually pumped optical amplifying media, and (b) means for controlling the temperature of at least a portion of at least one of said individually pumped optical amplifying media to control the shape of said gain spectrum of the multistage optical amplifier.

29. The multistage optical amplifier, which has a gain spectrum and comprises: (i) a concatenation of at least two individually pumped optical amplifying media, and (ii) means for controlling the temperature of at least a portion of at least one of said individually pumped optical amplifying media to control the shape of said gain spectrum of the multistage optical amplifier, wherein:
   (a) each optical amplifying medium can have at least a first and a second level of inversion, with the first level of inversion being higher than the second level of inversion;
   (b) the gain spectrum of the multistage optical amplifier extends from shorter wavelengths to longer wavelengths; and
   (c) increasing the temperature of said portion for the first level of inversion results in an increase in gain for longer wavelengths relative to shorter wavelengths and increasing the temperature of said portion for the second level of inversion results in an increase in gain for shorter wavelengths relative to longer wavelengths.

30. The multistage optical amplifier of claim 29 wherein the shorter wavelengths are in the range from about 1529 nm to about 1545 nm and the longer wavelengths are in the range from about 1545 nm to about 1565 nm.

31. An optical amplifier having a gain spectrum and comprising:
   (a) an optical amplifying medium which comprises a first portion and a second portion, the average inversion of the first portion being less than the average inversion of the second portion; and
   (b) means for controlling the temperature of the first portion to control the shape of the gain spectrum of the optical amplifier;
wherein the temperature of the second portion is not controlled.

32. A multistage optical amplifier having a gain spectrum and comprising:
   (a) a concatenation of a first individually pumped optical amplifying medium and a second individually pumped optical amplifying medium, the average inversion of the first medium being less than the average inversion of the second medium; and
   (b) means for controlling the temperature of the first medium or a portion thereof to control the shape of said gain spectrum of the multistage optical amplifier;
wherein the temperature of the second medium is not controlled.

* * * * *